(12) United States Patent
Asaka et al.

(10) Patent No.: US 8,312,025 B2
(45) Date of Patent: Nov. 13, 2012

(54) INFORMATION PROCESSING DEVICE, INFORMATION PROCESSING METHOD, AND INFORMATION PROCESSING PROGRAM

(75) Inventors: Kotaro Asaka, Tokyo (JP); Takashi Kinouchi, Tokyo (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 11/993,646

(22) PCT Filed: Jun. 16, 2006

(86) PCT No.: PCT/JP2006/312142
§ 371 (c)(1),
(2), (4) Date: Jun. 3, 2010

(87) PCT Pub. No.: WO2007/004408
PCT Pub. Date: Jan. 11, 2007

(65) Prior Publication Data
US 2011/0225175 A1    Sep. 15, 2011

(30) Foreign Application Priority Data

Jun. 30, 2005  (JP) .................................. 2005-191460
May 11, 2006   (JP) .................................. 2006-132345

(51) Int. Cl.
G06F 7/00      (2006.01)
G06F 17/30     (2006.01)
(52) U.S. Cl. ...................................................... 707/752
(58) Field of Classification Search ................... 707/752
See application file for complete search history.

(56) References Cited

U.S. PATENT DOCUMENTS

| | | | |
|---|---|---|---|
| 6,243,701 B1 * | 6/2001 | Shih et al. ............................. | 1/1 |
| 2001/0020238 A1 * | 9/2001 | Tsuda ................................ | 707/5 |
| 2002/0054135 A1 * | 5/2002 | Noguchi et al. ............... | 345/788 |
| 2003/0034964 A1 * | 2/2003 | Yoshioka ....................... | 345/204 |

(Continued)

FOREIGN PATENT DOCUMENTS

JP    7 21212    1/1995

(Continued)

OTHER PUBLICATIONS

Office Action issued Mar. 8, 2011, Japanese Patent Application No. 2006-132345.

(Continued)

*Primary Examiner* — Robert Beausoliel, Jr.
*Assistant Examiner* — Nicholas Allen
(74) *Attorney, Agent, or Firm* — Oblon, Spivak, McClelland, Maier & Neustadt, L.L.P.

(57) ABSTRACT

In a PC (100), an information acquisition device (120) acquires a plurality of meta information items. A storage device (130) stores a plurality of modules each having rules defined for creating a sort-ready text according to readings representative of how the corresponding acquired meta information item is read. A sort-ready text creation device (140) creates automatically the sort-ready text for each of the meta information items acquired by use of at least one of the stored modules which includes rules applicable to predetermined conditions. A sort execution device (150) sorts each of the meta information items based on the sort-ready text which has been created automatically, thereby automatically creating sorted meta information. An initial information creation device (160) creates initial information including an initial of each of the meta information items before adding the created initial information to each of the meta information items. These devices combine to sort the meta information according to the user's language and preferences.

19 Claims, 18 Drawing Sheets

U.S. PATENT DOCUMENTS

| | | | |
|---|---|---|---|
| 2003/0182310 A1* | 9/2003 | Charnock et al. | 707/104.1 |
| 2004/0010493 A1* | 1/2004 | Kojima et al. | 707/4 |
| 2005/0203900 A1* | 9/2005 | Nakamura et al. | 707/5 |
| 2005/0210008 A1* | 9/2005 | Tran et al. | 707/3 |
| 2005/0283804 A1* | 12/2005 | Sakata et al. | 725/52 |
| 2006/0114762 A1* | 6/2006 | Kanai | 369/30.09 |
| 2006/0169126 A1* | 8/2006 | Ishiwata et al. | 84/615 |
| 2007/0005581 A1* | 1/2007 | Arrouye et al. | 707/4 |
| 2008/0046824 A1* | 2/2008 | Li et al. | 715/739 |

FOREIGN PATENT DOCUMENTS

| | | |
|---|---|---|
| JP | 10-308810 | 11/1998 |
| JP | 11 95773 | 4/1999 |
| JP | 2002 328950 | 11/2002 |
| JP | 2003-59237 | 2/2003 |
| JP | 2004-206648 | 7/2004 |
| JP | 2004 280995 | 10/2004 |
| JP | 2005-4891 | 1/2005 |
| JP | 2005 4916 | 1/2005 |
| JP | 2005-43654 | 2/2005 |
| JP | 2005 165959 | 6/2005 |

OTHER PUBLICATIONS

Japanese Office Action issued Oct. 12, 2010, in Patent Application No. 2007-153203.

* cited by examiner

FIG.10

JAPANESE LANGUAGE VERSION

SORT-USE INITIAL CHARACTER SETTINGS

SETTINGS FOR AUTOMATICALLY CREATING A SORT-READY TEXT

- ■ ADD READINGS IN HIRAGANA
- ■ ADD READINGS OF NICKNAMES IN KANA CHARACTERS
- ■ DELETE DEFINITE ARTICLES IN ENGLISH
- ■ DELETE JAPANESE PREFIX "ZA" USED AS A FAKE DEFINITE ARTICLE (SKIP "ZA")
- ☐ ADD READINGS OF DIFFICULT-TO-READ ARTIST NAMES IN KANA CHARACTERS
- ☐ ADD READINGS OF NUMBERS IN KANA CHARACTERS

SORT ORDER AND INITIAL CHARACTER SETTINGS

- ◉ FOR USERS WHO PREFER WESTERN MUSIC
  ABC .../NUMBERS/ [A-N] /OTHER

- ○ FOR USERS WHO PREFER JAPANESE MUSIC
  "A" SYLLABARY ROW, "KA" SYLLABARY ROW, ..../NUMBERS/ [A-Z] /OTHER

[ CANCEL ]  [ OK ]

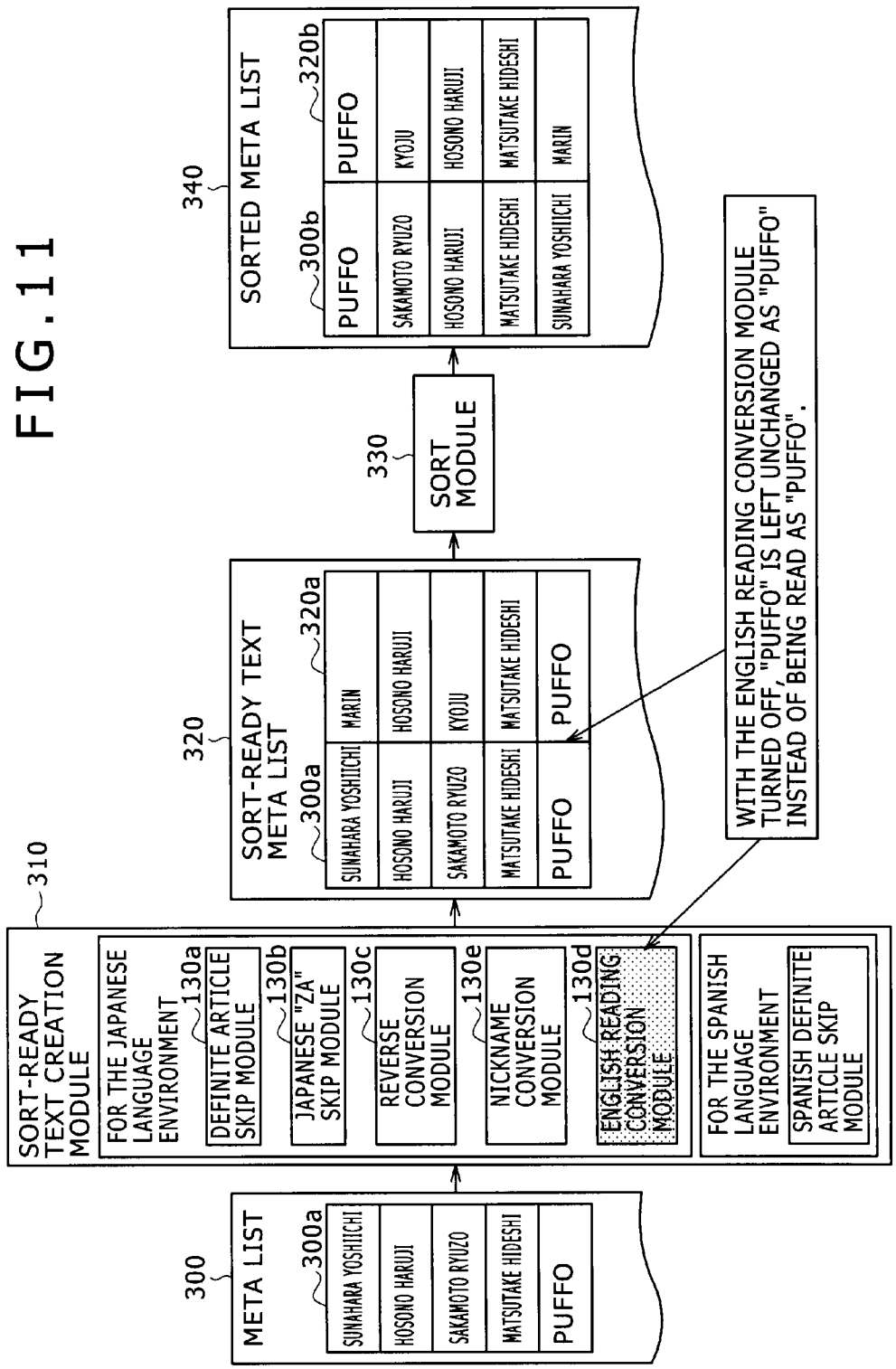

FIG. 12

| PC-DESTINED LANGUAGES | MODE | CHARACTER TYPES THAT CAN BE SET FOR SORT ORDER |
|---|---|---|
| JAPANESE | JAPANESE LANGUAGE MODE | NUMBERS AND SYMBOLS/ALPHABETIC CHARACTERS/ JAPANESE (READING IN KANA CHARACTERS)/OTHER |
| KOREAN | KOREAN LANGUAGE MODE | HANGUL AND CHINESE CHARACTERS (READINGS IN PHONETIC ALPHABET)/NUMBERS AND SYMBOLS/ ALPHABETIC CHARACTERS/OTHER |
| CHINESE | CHINESE LANGUAGE MODE | NUMBERS AND SYMBOLS/ALPHABETIC CHARACTERS/ AND SIMPLIFIED AND TRADITIONAL CHINESE CHARACTERS (READINGS IN PHONETIC ALPHABET)/OTHER |
| ENGLISH, FRENCH, GERMAN, ITALIAN AND SPANISH | ENGLISH LANGUAGE MODE | NUMBERS AND SYMBOLS/ALPHABETIC CHARACTERS/ OTHER |
| RUSSIAN | RUSSIAN LANGUAGE MODE | NUMBERS AND SYMBOLS/ALPHABETIC CHARACTERS/ CYRILLIC CHARACTERS/OTHER |

FIG. 14

| CHARACTER TYPES | TYPICAL INITIALS | BASIC SORT RULES |
|---|---|---|
| ALPHABETIC CHARACTERS | A, B, C, ... Z | (1) IN ALPHABETICAL ORDER<br>(2) UPPERCASE LETTERS → LOWERCASE LETTERS |
| NUMBERS AND SYMBOLS | 1, 2, 3, ... 9; # | NUMBERS (IN ORDER OF CHARACTER CODES) → SYMBOLS (IN ORDER OF CHARACTER CODES) |
| HANGUL | HANGUL CONSONANTS (ㄱ, ㄴ, ..., ㅍ, ㅎ, ...), CHINESE CHARACTERS | LEXICAL ORDER (= IN ORDER OF CHARACTER CODES) |
| JAPANESE | "A" SYLLABARY ROW, "KA" SYLLABARY ROW, ..., KANJI | (1) IN JAPANESE ALPHABETICAL ORDER (2) HIRAGANA → KATAKANA (3) NORMAL PRONUNCIATIONS → NASAL "N" → VOICED CONSONANTS → PLOSIVES (4) IN ORDER OF CHARACTER CODES |
| ALPHABETIC CHARACTERS AND SIMPLIFIED AND TRADITIONAL CHINESE CHARACTERS (READ IN PINYIN) | A, B, C, ... Z, SIMPLIFIED CHINESE CHARACTERS, TRADITIONAL CHINESE CHARACTERS | (1) A IN ENGLISH, A IN CHINESE, B IN ENGLISH, B IN CHINESE, ... Z IN ENGLISH, Z IN CHINESE (2) THE SAME RULES AS THOSE FOR ALPHABETIC CHARACTERS (3) IN ORDER OF CHARACTER CODES |
| CYRILLIC CHARACTERS | IN CYRILLIC ALPHABETICAL ORDER (А,Б,...,Ю,Я) | (1) IN CYRILLIC ALPHABETICAL ORDER<br>(2) UPPERCASE CHARACTERS → LOWERCASE CHARACTERS |
| OTHER | OTHER | IN ORDER OF CHARACTER CODES |

FIG.16

CHINESE LANGUAGE VERSION

SORT-USE INITIAL CHARACTER SETTINGS

SETTINGS FOR AUTOMATICALLY CREATING A SORT-READY TEXT

- ■ ADD READINGS OF CHINESE CHARACTERS IN PINYIN
- ☐ ADD READINGS OF DIFFICULT-TO-READ ARTIST NAMES IN PINYIN
- ☐ ADD READINGS OF NUMBERS IN PINYIN

SORT ORDER AND INITIAL CHARACTER SETTINGS

○ MIXED SORT
ABC ... (INCLUDING READINGS PINYIN) /NUMBERS/OTHER

◉ INDEPENDENT SORT
ALPHABETIC CHARACTERS/SIMPLIFIED CHINESE CHARACTERS READ IN PINYIN/ TRADITIONAL CHINESE CHARACTERS READ IN PINYIN/OTHER

[CANCEL] [OK]

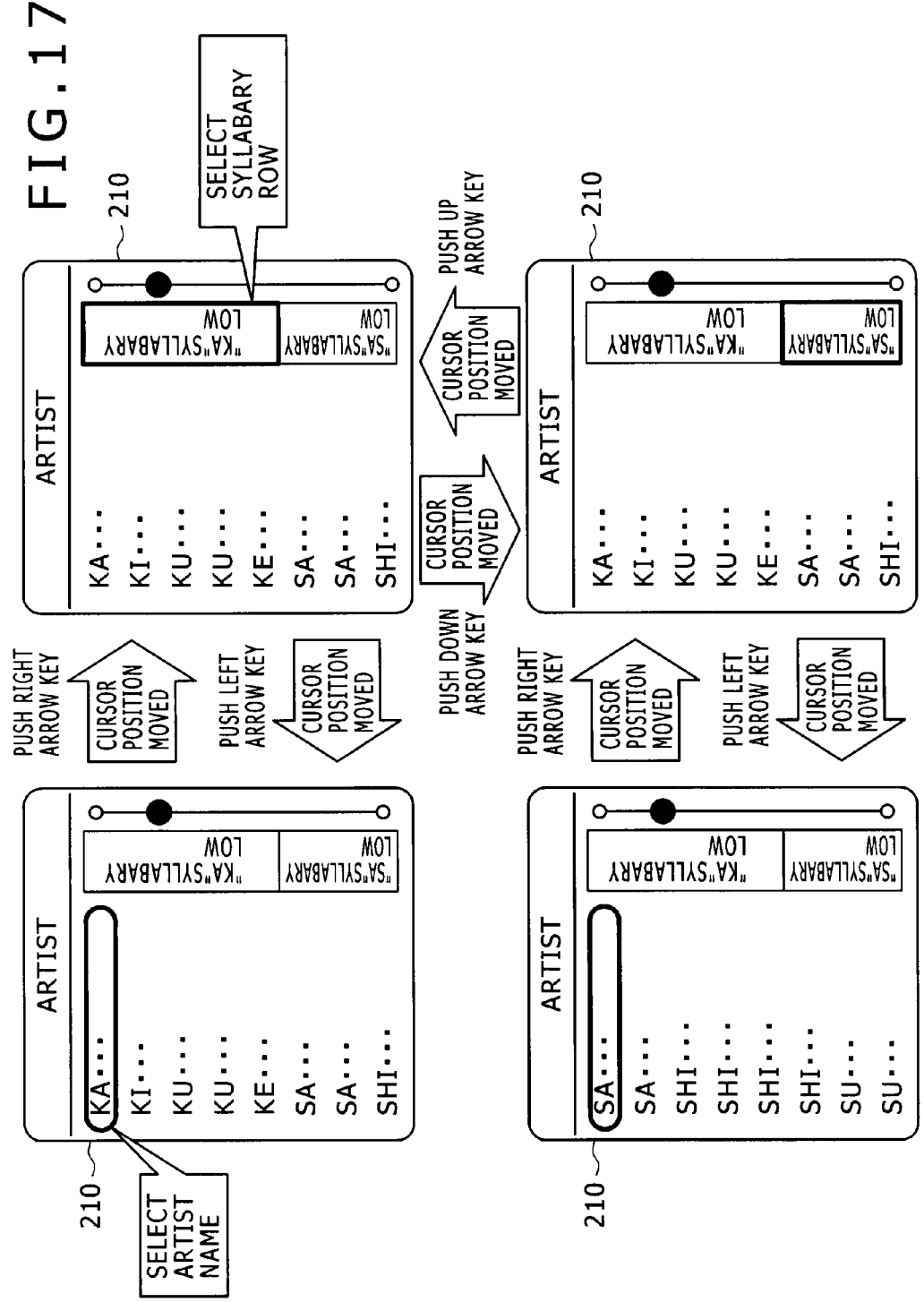

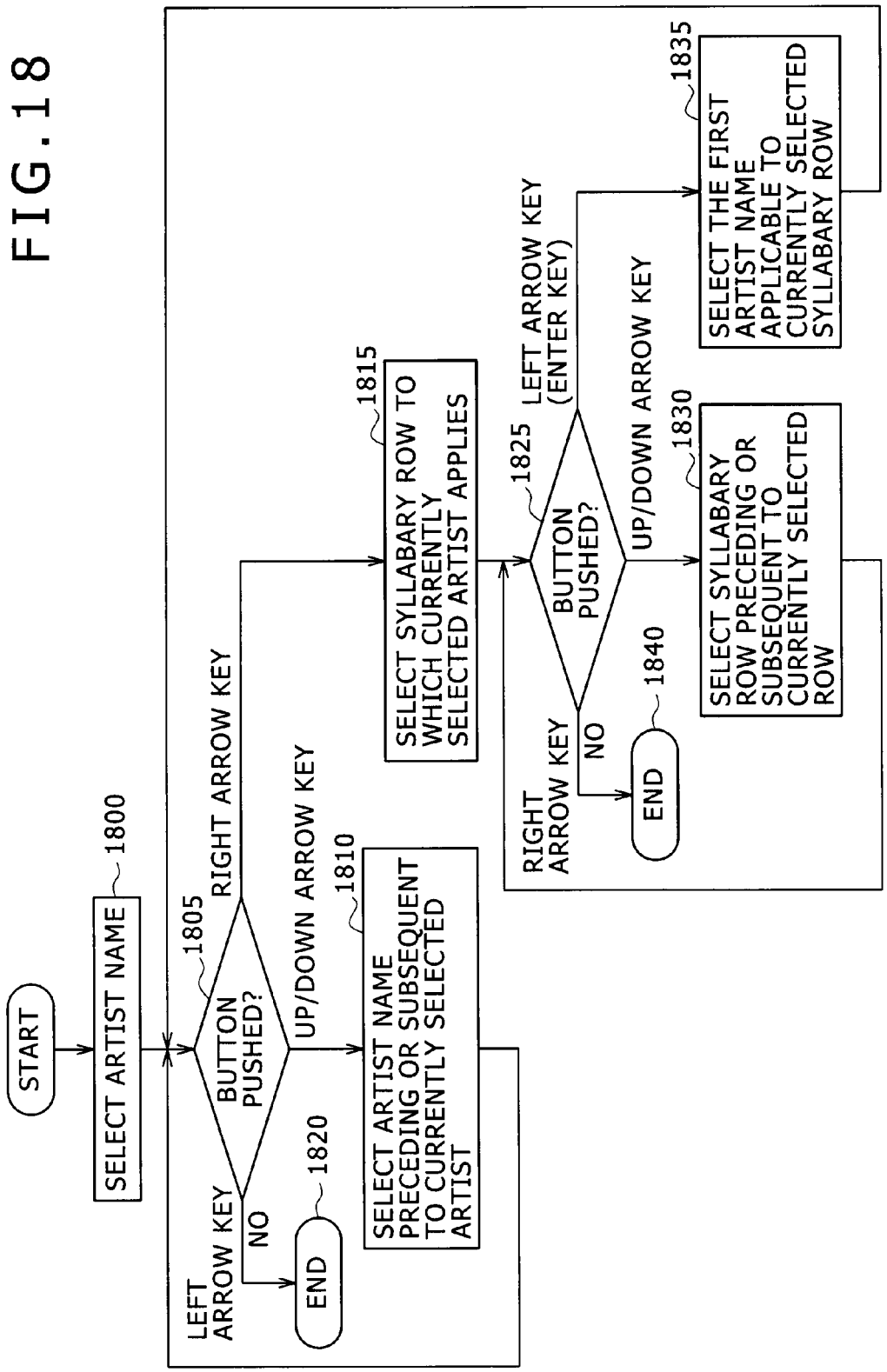

INFORMATION PROCESSING DEVICE, INFORMATION PROCESSING METHOD, AND INFORMATION PROCESSING PROGRAM

TECHNICAL FIELD

The present invention relates to an information processing apparatus, an information processing method, and an information processing program for sorting meta information.

BACKGROUND ART

There have been proposed techniques for creating a database in which the identification codes for identifying metadata items are associated with the readings (i.e., names) of the items in such a manner that the name of a given metadata item may be determined by searching through the database for the identification code of the item in question. One such technique (e.g., proposed in Japanese Patent Laid-open No. 2004-206648) involves getting a user terminal to read a TOC (table of contents) from a CD or a DVD as an identification key that determines the names of metadata items held on the storage medium so that the user is informed of the reading of any given metadata item.

DISCLOSURE OF INVENTION

According to most techniques proposed so far, the identification codes of metadata items in Japanese are arranged to correspond on a one-to-one basis to the character codes of the items as they are read in the Chinese way. Whenever metadata items are to be sorted out using their read names, the items are most often assumed to have been read in the Chinese way before being sorted in the Japanese alphabetical order despite the fact that some items can only be read in the Japanese way. This requires the user to search for a desired content (e.g., movie or song) through the metadata items that have been sorted in a manner not necessarily reflecting the actual order of contents. This makes it difficult for the user to search for and retrieve the content of interest quickly for enjoyment.

In recent years, content reproducing apparatuses such as portable devices (PDs) have come to possess storage facilities for accommodating huge quantities of contents. This has required the user to spend ever-increasing amounts of time and effort to search for the desired content from the enormous quantities of stored contents. Thus there has been a growing need for an apparatus and a method which would allow the user to retrieve and enjoy preferred contents as quickly as possible instead of having to undertake the chores of making tiresome, time-consuming searches.

The present invention has been made in view of the above circumstances and provides an information processing apparatus, an information processing method, and an information processing program for sorting meta information according to the language and preferences of the user.

In achieving at least one of the foregoing and other objects of the present invention and according to one embodiment thereof, there is provided an information processing apparatus including: an information acquisition device configured to acquire a plurality of meta information items; a storage device configured to store a plurality of modules each having rules defined for creating a sort-ready text according to readings representative of how the corresponding acquired meta information item is read; and a sort-ready text creation device configured to create automatically the sort-ready text for each of the meta information items acquired by use of at least one of the stored modules which includes rules applicable to predetermined conditions.

Meta information refers to, say, the titles (content names), album names and artist names of music contents, and other attribute information about such contents. The readings of a given meta information item signify the way in which is read each of the characters constituting character strings that form the names of the attributes of the contents involved. For example, if the character string of given meta information is made up of kanji characters, then the readings of the information are determined by whether each character in the string (or the word composed of the character string) is read in the Japanese way or in the Chinese way. If the character string of given meta information is constituted by alphabetic characters, then the readings of the information are determined by how each character in the string is read.

Preferably, the information processing apparatus according to the invention may further include a sort execution device configured to sort each of the meta information items based on the sort-ready text which has been created automatically for each of the meta information items, thereby automatically creating sorted meta information made up of a plurality of sorted meta information items.

Preferably, the information processing apparatus according to the invention may further include an initial information creation device configured to create initial information from each of the meta information items included in the sorted meta information based on the predetermined conditions, before adding the created initial information to each of the meta information items included in the sorted meta information, thereby creating automatically the sorted meta information furnished with the initial information.

The sorted meta information furnished with the initial information signifies the meta information which has been rearranged based on the readings of each meta information item (i.e., read sequence/character string sequence of the names of the attributes involved) and which is supplemented with the initial information about the meta information in question.

Preferably, based on the condition of creating initial information beginning with a first character of given information, the initial information creation device may create the initial information beginning with a first character of each of the meta information items included in the sorted meta information. This preferred structure provides quick access to such meta information as artist names or song titles designated by the user in accordance with the initial information.

Preferably, based on the condition of creating initial information from a specific character string included in given information, the initial information creation device may create the initial information from the specific character string of each of the meta information items included in the sorted meta information. This preferred structure enables quick access to such meta information as artist names or song titles including a user-designated keyword such as "Christmas" based on the initial information.

According to any one of the above-outlined preferred structures of the invention, the sort-ready text is created on the basis of the rules defined by the module or modules and in keeping with predetermined conditions. The metadata is sorted by use of the created sort-ready text. The metadata thus sorted is then supplemented with the initial information.

Preferably, the plurality of modules stored in the storage device may be among a definite article skip module, a Japanese "za" skip module, a reverse conversion module, an English reading conversion module, a nickname conversion module, a symbol reading conversion module, a difficult-to-read name conversion module, a number reading conversion module, and a first name/surname inversion module.

The metadata is sorted into readings in Japanese kana characters in keeping with the user's preferences and according to the rules defined by the modules. As opposed to the traditional way of rearranging metadata solely by its readings in the Chinese way, the inventive structure adds Japanese readings in kana to the metadata in a manner reflecting the user's preferences so that the user can quickly search for a desired content and enjoy it in a timely fashion through the use of the metadata sorted according to the added readings.

Preferably, the sort-ready text creation device may select at least one of the plurality of modules for sorting each of the meta information items in accordance with at least either conditions established by a user or a language used by the user, and may automatically create the sort-ready text based on the rules defined by the selected module or modules.

According to the above-outlined preferred structure of the invention, the metadata is sorted into Japanese readings in a manner better reflecting the user's preferences based on the user-established conditions or on the language employed by the user. The preferred structure allows the user to access the desired content more quickly than before.

Preferably, the storage device may store priorities of the rules defined by each of the stored modules, the priorities being in effect when the rules are applied; and the sort-ready text creation device may adopt the rules successively beginning with the rule of the highest priority down to that of the lowest priority as defined by the selected module or modules, as the rules for creating the sort-ready text.

Preferably, if each of the acquired meta information items is made up of at least two character types, then the sort execution device may classify the meta information items by each of the character types and may sort each of the classified meta information items based on the sort-ready text associated with the classified meta information item in question, thereby creating sorted meta information for each of the character types.

Preferably, the initial information creation device may merge the meta information items sorted by each of the character types and may add the initial information to each of the meta information items included in the merged sorted meta information, thereby creating the sorted meta information furnished with the initial information.

Preferably, the display device may display the meta information having the initial designated by the user, through the use of the initial information included in the sorted meta information furnished with the initial information.

Preferably, if each of the acquired meta information items is in Japanese, then the sort-ready text creation device may automatically create a sort-ready text in kana characters for each of the meta information items through the use of a kanji-to-kana conversion module selected from among the plurality of modules; the sort execution device may sort each of the meta information items in the Japanese alphabetical order through the use of the automatically created sort-ready text in kana characters; the initial information creation device may add the initial information to each of the meta information items sorted in the Japanese alphabetical order; and, based on the initial information, the display device may display consecutively the meta information items in the Japanese alphabetical order starting from the meta information having the initial designated by the user.

Preferably, the information processing apparatus according to the invention may further include a display device configured to display the sorted meta information furnished with the initial information created automatically. In another preferred structure, the information processing apparatus according to the invention may further include an information output device configured to cause an external apparatus to display the sorted meta information furnished with the initial information created automatically.

Preferably, the information output device may cause the external device to display the meta information having the initial designated by the user, through the use of the initial information included in the sorted meta information furnished with the initial information.

Preferably, if each of the acquired meta information items is in Japanese, then the sort-ready text creation device may automatically create a sort-ready text in kana characters for each of the meta information items through the use of a kanji-to-kana conversion module selected from among the plurality of modules; the sort execution device may sort each of the meta information items in the Japanese alphabetical order through the use of the automatically created sort-ready text in kana characters; the initial information creation device may add the initial information to each of the meta information items sorted in the Japanese alphabetical order; and, based on the initial information, the display device may display consecutively the meta information items in the Japanese alphabetical order starting from the meta information included in a Japanese syllabary row designated by the user.

Preferably, the display device may display kana characters in the Japanese alphabetical order, may prompt the user to designate one of the displayed kana characters and, based on the initial information, may display consecutively the meta information items in the Japanese alphabetical order starting from the meta information having the designated initial. In another preferred structure, the display device may display consecutively the meta information items starting from the meta information included in one of two syllabary rows, one immediately preceding and the other immediately following the syllabary row including the meta information being displayed, in response to an operation by the user and based on the initial information.

Preferably, the information processing apparatus according to the invention may be a reproduction apparatus configured to reproduce contents indicated by the meta information being displayed.

With any one of the preferred structures of the invention outlined above, the user is able to search quickly for the desired content using the metadata sorted in a manner better reflecting the user's preferences so as to reproduce and enjoy the content in timely fashion.

According to another embodiment of the present invention, there is provided an information processing method including the steps of: acquiring a plurality of meta information items; storing into a storage device a plurality of modules each having rules defined for creating a sort-ready text according to readings representative of how the corresponding acquired meta information item is read; creating automatically the sort-ready text for each of the meta information items acquired by use of at least one of the stored modules which includes rules applicable to predetermined conditions; sorting each of the meta information items corresponding to each of the sort-ready texts based on the sort-ready text which has been created automatically for each of the meta information items, thereby automatically creating sorted meta information made up of a plurality of sorted meta information items; and creating initial information from each of the meta information items included in the sorted meta information based on the predetermined conditions, and adding the created initial information to each of the meta information items included in the sorted meta information, thereby creating automatically the sorted meta information furnished with the initial information.

According to a further embodiment of the present invention, there is provided an information processing program for causing a computer to carry out a procedure including the steps of: acquiring a plurality of meta information items; storing into a storage device a plurality of modules each having rules defined for creating a sort-ready text according to readings representative of how the corresponding acquired meta information item is read; creating automatically the sort-ready text for each of the meta information items acquired by use of at least one of the stored modules which includes rules applicable to predetermined conditions; sorting each of the meta information items corresponding to each of the sort-ready texts based on the sort-ready text which has been created automatically for each of the meta information items, thereby automatically creating sorted meta information made up of a plurality of sorted meta information items; and creating initial information from each of the meta information items included in the sorted meta information based on the predetermined conditions, and adding the created initial information to each of the meta information items included in the sorted meta information, thereby creating automatically the sorted meta information furnished with the initial information.

With any one of the embodiments outlined above, the metadata is sorted into Japanese readings in a manner reflecting the user's preferences in accordance with predetermined rules. This allows the user to have quick access to the desired content by use of the metadata sorted according to the user's preferences and/or the user's language environment.

BRIEF DESCRIPTION OF DRAWINGS

FIG. 10 is a schematic view showing a user setting screen of the Japanese language version for use with a second embodiment of the present invention.

FIG. 11 is a schematic view explanatory of how a sort-ready text is dynamically created by the second embodiment according to user settings.

FIG. 12 is a tabular view showing sort settings which vary depending on the language environment.

FIG. 14 is a tabular view showing initial sort settings by character type.

FIG. 16 is a schematic view showing a user setting screen of the Chinese language version for use with the second embodiment.

FIG. 17 is a schematic view explanatory of another typical index jump search made on the portable music player.

FIG. 18 is a flowchart of steps constituting a typical an index jump search routine.

BEST MODE FOR CARRYING OUT THE INVENTION

Figure 1:
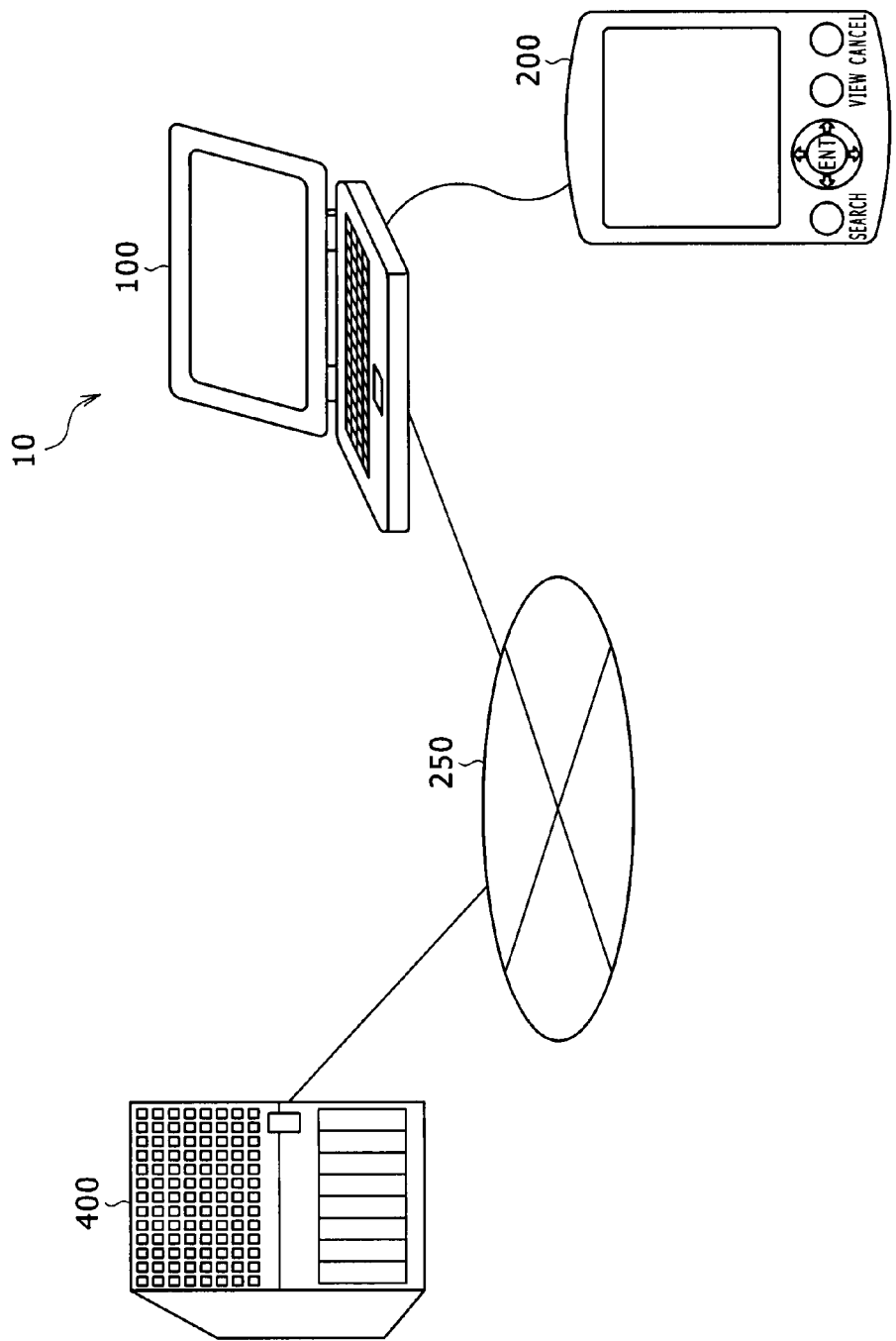
FIG. 1 is a schematic view showing an overall configuration of an information processing system practiced as a first embodiment of the present invention.

The preferred embodiments of the present invention will now be described in detail with reference to the accompanying drawings. Throughout the drawings and the ensuing description, like or corresponding parts in terms of function and structure will be designated by like reference numerals, and their explanations will be omitted where redundant.

First Embodiment (Overall Configuration and General Workings of the Information Processing Apparatus)

Described below in reference to FIG. 1 are the overall configuration and general workings of an information processing system practiced as a first embodiment of the present invention.

The information processing system 10 is made up of a personal computer (PC) 100 and a portable music player 200. The PC 100 and the portable music player 200 are interconnected in wired or wireless fashion illustratively through a USB (Universal Serial Bus) interface. The PC 100 is connected to a CDDB (CD database) server 400 via a network 250.

The CDDB server 400 holds not only the contents (songs) stored on music CDs but also the metadata (meta information) indicative of the song titles and artist names related to the contents. The PC 100 acquires metadata from the CDDB server 400 and sorts the acquired metadata on the basis of the user preferences and his or her language environment.

The portable music player 200 shows on its display unit the metadata sorted according to the user's preferences and reproduces the content corresponding to the metadata designated by the user. The portable music player 200 is a typical portable device (PD).

The metadata is a kind of data which allows users to select and gather contents efficiently without scrutinizing the entire content of interest. The metadata typically includes titles, author names, dates of creation, artist names, song titles, and other basic information (attributes) regarding contents.

A process called "initial sort," to be discussed later, involves rearranging metadata items based on their readings such as music content titles (content names), album titles, and artist names as read in a given language (i.e., read sequence/character string sequence of the attribute information about each content). The reading of metadata signifies the order in which the characters making up each metadata character string are read. In the description that follows, the read sequence and character string sequence will be referred to generically as the read sequence.

(Outline of the Sort-Ready Text)

Figure 2:
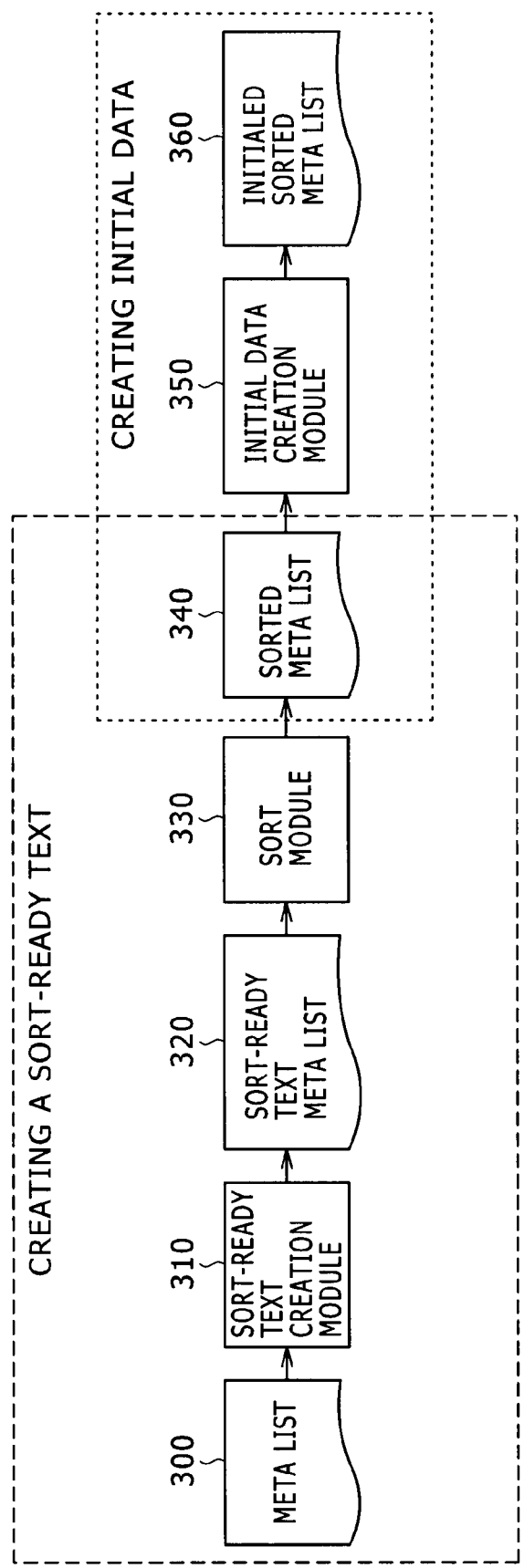
FIG. 2 is a schematic view outlining how a sort-ready text and initial data are created by the first embodiment.

As shown in FIG. 2, the PC 100 automatically creates a sort-ready text creation module 310, to be described later. Using the sort-ready text creating module 310 thus created, the PC 100 adds a sort-ready text to each of the metadata items included in a meta list 300 in order to create a sort-ready text meta list 320 (sort-ready text metadata). Using a sort module 300, the PC 100 then sorts the metadata items in the sort-ready text meta list 320 to create a sorted meta list 340.

(Outline of Initial Data Creation)

On the basis of an initial data creation module 350, the PC 100 creates the initials (initial letters) of the sorted metadata items contained in the sorted meta list 340. By adding the created initial information to each of the sorted metadata items in the sorted meta list 340, the PC 100 creates an initial information-furnished sorted meta list 360 (initial information-furnished sorted meta data).

The PC 100 proceeds to send the initial information-furnished sorted meta list 360 thus created to the portable music player 200 together with the corresponding contents.

(Functions of the PC 100)

Figure 3:
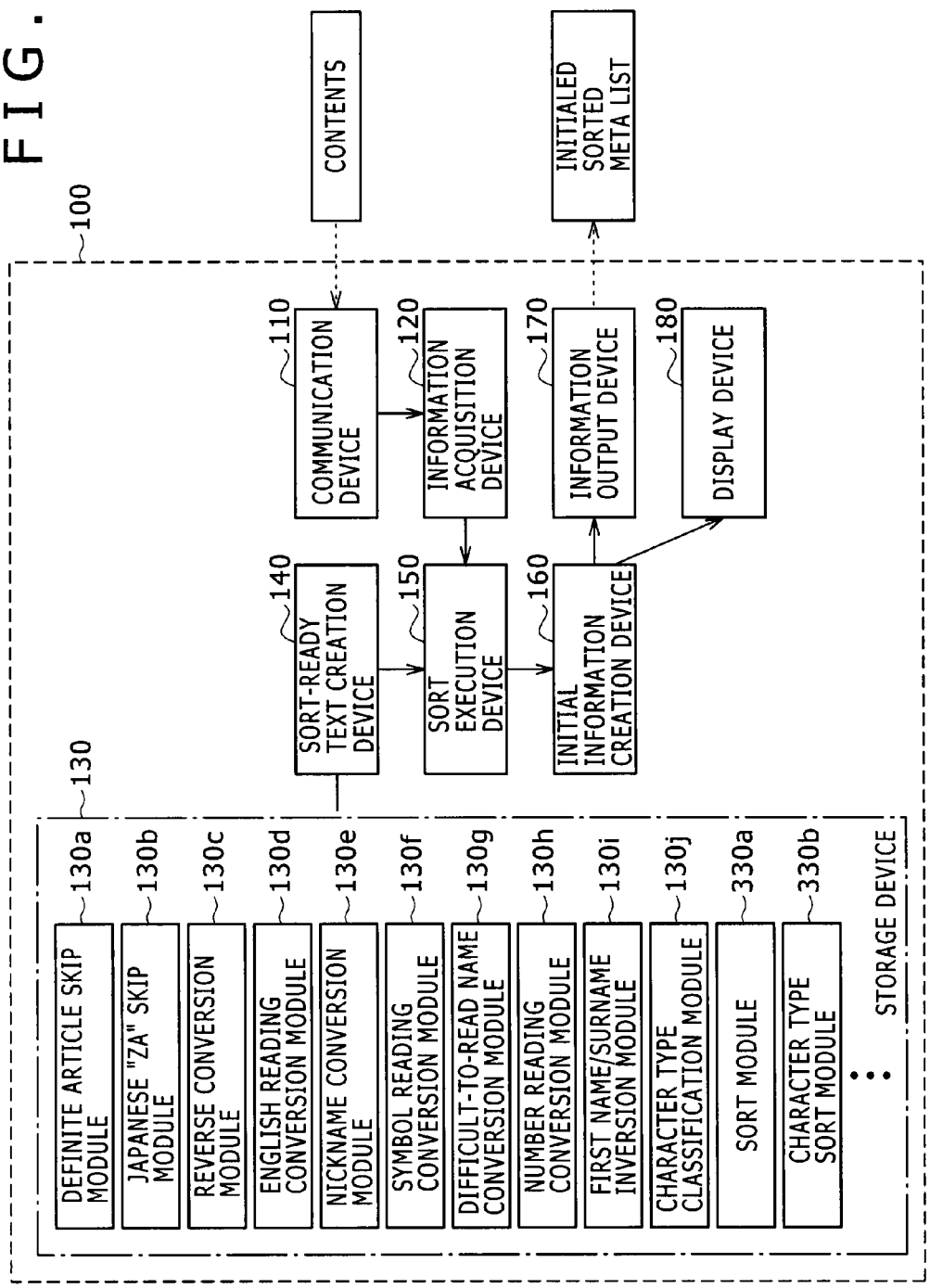
FIG. 3 is a functional block diagram showing functional blocks of a personal computer (PC).

The principal functions of the PC 100 will now be described in reference to FIG. 3 which shows functional blocks of the PC 100. As its functional blocks, the PC 100 includes a communication device 110, an information acquisition device 120, a storage device 130, a sort-ready text creation device 140, a sort execution device 150, an initial information creation device 160, an information output device 170, and a display device 180.

The communication device 110 receives songs (contents) illustratively from the CDDB server 400. From the received contents, the information acquisition device 120 acquires metadata (meta information) indicative of the artist names and song titles of the contents in question.

The storage device 130 stores a plurality of modules each defining the rules for creating the sort-ready text creation module 310 shown in FIG. 2. The plurality of modules may typically include a definite article skip module 130*a*, a Japanese "za" skip module 130*b*, a reverse conversion module 130*c*, an English reading conversion module 130*d*, a nickname conversion module 130*e*, a symbol reading conversion module 130*f*, a difficult-to-read name conversion module 130*g*, a number reading conversion module 130*h*, a first name/surname inversion module 130*i*, a character type classification module 130*j*, a sort module 330*a*, and a character type sort module 330*b*.

The definite article skip module 130*a* is a module that defines the rules for deleting definite articles from metadata in various languages (e.g., English, French, Italian, German, Spanish). Using the rules, the definite article skip module 130 deletes definite articles from metadata to create a sort-ready text. Illustratively, given metadata "The Beat," the definite article skip module 130*a* creates a sort-ready text "Beat." The definite article skip module 130*a* may apply to the metadata written in diverse languages.

The Japanese "za" skip module 130*b* is a module that defines the rules for deleting the definite article of a foreign language phonetically written in Japanese such as "ザ" or "ザ<space>" representing "the" of the English language. Using the rules, the Japanese "za" skip module 130*b* may illustratively create a sort-ready text such as "ビート" (beat) from metadata "ザ　ビート" (the beat). The Japanese "za" skip module 130*b* is applied when metadata is described in Japanese.

The reverse conversion module 130*c* is a module that defines the rules for acquiring Japanese readings of metadata by use of a function similar to the reverse conversion function of an IME (Input Method Editor: generic term for Japanese language input programs designed primarily for kana-to-kanji conversion assisting in the input of Japanese sentences).

Using the rules, the reverse conversion module 130*c* is applied illustratively to the conversion of Japanese, Chinese, and Korean.

For example, if the metadata indicates an artist name "砂原良一" (Sunahara Yoshiichi) that needs to be converted to a sort-ready text in hiragana or katakana, then the reverse conversion module 130*c* creates a sort-ready text "すなはらよしいち" or "スナハラヨシイチ" (Sunahara Yoshiichi) out of the metadata "砂原良一." As another example, if the metadata indicates an artist name "青山典子" (Aoyama Noriko), then the reverse conversion module 130*c* creates a sort-ready text "あおやまのりこ" (Aoyama Noriko) in hiragana or "アオヤマノリコ" in katakana from the metadata "青山典子."

If the target sort-ready text to be created is in Chinese, then the reverse conversion module 130*c* creates a sort-ready text "QING (青)" SHAN (山) DIAN (典) ZI (子)" in pinyin from the metadata "青山典子."

If the target sort-ready text to be created is in Korean, then the reverse conversion module 130*c* creates sort-ready texts "아오야마노리코(read phonetically in Hangul)" and "청산전자 (read in the Chinese way)" from the metadata "青山典子" (Aoyama Noriko).

The reverse conversion module 130*c* may come in two types: an artist name reverse conversion module for converting artist names as read in kana, and a song title (general) reverse conversion module for converting song titles as read in kana. Meta information includes various kinds of information such as artist names, song titles, and album titles. The accuracy of conversion can be improved by having different types of meta information converted using applicable reverse conversion modules. For example, the artist names may be converted by the artist name reverse conversion module and the song titles by the song title (general) reverse conversion table. More specifically, a Japanese artist name "杏子" (Kyoko) is converted to "キョウコ" (Kyoko) while the same kanji name "杏子" in a song title is correctly converted to "アンズ" (Anzu). This can prove to be a very significant improvement in the accuracy of artist name conversion.

Furthermore, in the event of an incorrect reverse conversion, the user may register the correct "displayed notation," "reading," and "part of speech (e.g., common name, verb, full name, surname, first name, group name)" with the reverse conversion module. With such registration carried out, next time a song by the same artist whose name was not correctly converted is ripped, the artist name is converted properly. If desired, the registered contents may be uploaded to the server to revise dictionaries stored therein.

The English reading conversion module 130*d* is a module which has a dictionary containing the Japanese readings of the alphabetic characters and which defines the rules for acquiring, based on that dictionary, the readings of given metadata in alphabetic characters. By applying the rules to a given metadata item, this module creates a sort-ready text of its reading in kana. The English reading conversion module 130*d* may be applied to the conversion from alphabetic characters to Japanese, Chinese, or Korean. For example, when converting an English word "PUFFO" to Japanese, the English reading conversion module 130*d* creates a sort-ready text "ぱふぉー" written phonetically in hiragana or "パフォー" in katakana based on the dictionary containing the Japanese readings of alphabetic characters.

The nickname conversion module 130*e* is a module which has a dictionary containing typical nicknames of personal names and which defines the rules for acquiring, based on that dictionary, the nickname of a given personal name. By applying the rules to a given metadata item, this module creates a sort-ready text of the corresponding nickname. For example, by resorting to the dictionary containing the nicknames of personal names, the nickname conversion module 130e converts, say, a personal name in Japanese "浜孝一" (Hama Koichi) into a typical Japanese nickname "はまちゃん" (Hamachan).

The symbol reading conversion module 130f is a module which has a dictionary containing the Japanese readings of symbols (e.g., ☆) and special characters and which defines the rules for acquiring, based on that dictionary, the reading of a given symbol or special character. For example, using the dictionary containing the Japanese readings of symbols and special characters, the symbol reading conversion module 130f converts, say, the symbol (☆) into "ほし" (hoshi) or "スター" (star). More specifically, the wording in Japanese "涙がキラリ☆" (namida ga kirari ☆; tears flash in the eyes ☆) is converted to "涙がキラリほし" (namida ga kirari hoshi). The dictionary may be provided in advance with entries stipulating that parentheses (『 』) are not to be read (or read as null characters). This allows the symbol reading conversion module 130f to covert, say, a Japanese word "『手紙』" (Tegami; letter) into "手紙." Thus the metadata in parentheses may be sorted only as read and without the use of symbols.

The difficult-to-read name conversion module 130g is a module which has a dictionary containing the Japanese readings of difficult-to-read names and which defines the rules for acquiring, based on that dictionary, the reading of metadata representing a name that is hard to read. By applying the rules to given metadata, this module creates a sort-ready text of the corresponding name that turns out difficult to read. For example, using the dictionary containing the Japanese readings of difficult-to-read names, the difficult-to-read name conversion module 130g may convert an apparently incomprehensible name "175R" into "いなごらいだー" (Inago raida).

The number reading conversion module 130h is a module that defines the rules for giving Japanese readings to numbers. For example, given the wording "君の瞳は１００万ボルト" (kimi no hitomi wa hyakuman boruto; your eyes sparkle with a million volts), the number reading conversion module 130h creates a spelled-out sentence "君の瞳はひゃくまんボルト."

The first name/surname inversion module 130i is a module that converts a metadata name written in the order of a surname with comma or none followed by a first name such as "surname, first name" or "surname first name", into the sequence of the first name followed by the surname such as "first name surname". For example, the first name/surname inversion module 130i turns "Back, Jeff" or "Back Jeff" into "Jeff Back."

The character type classification module 130j is a module that classifies a metadata item made up of at least two character types into metadata items by character type. Illustratively, if a metadata item is displayed both in alphabetic characters and in kanji, then the character type classification module 130j classifies the metadata into an alphabetic character metadata item and a kanji metadata item.

The sort module 330a creates sorted metadata by sorting given metadata based on a created sort-ready text of that metadata. The character type sort module 330b sorts each of the character type classified metadata items that have been classified by the character type classification module 130j, thus creating character type sorted metadata items.

The storage device 130 stores the above-described plurality of modules along with the priorities of the rules defined by these modules. The rules defined by the module of the highest priority are given the highest precedence when applied to creating sort-ready texts; the other rules are applied in descending order of their priorities when the corresponding modules are put to use successively.

From the multiple modules stored in the storage device 130, the sort-ready text creation device 140 selects at least one module (sort-ready text creation module 310) defining the rules in keeping with predetermined conditions and uses the selected module or modules to create a sort-ready text automatically. The conditions may include predetermined initial conditions, user-designated conditions, and the language employed by the user (e.g., Japanese for Japanese users).

Figure 4:
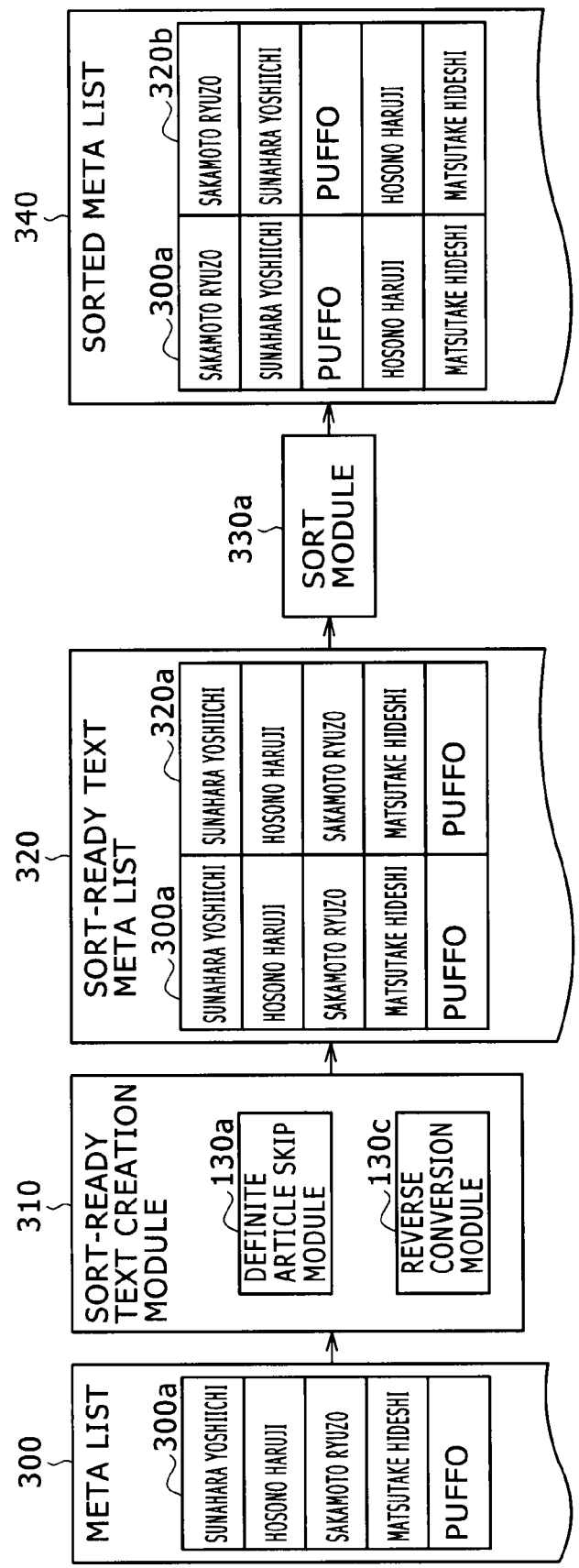
FIG. 4 is a schematic view explanatory of how a sort-ready text is created by the first embodiment.

Illustratively, as shown in FIG. 4, the definite article skip module 130a and reverse conversion module 130c may be selected from the plurality of modules held in the storage device 130 in accordance with predetermined conditions. In that case, the sort-ready text creation module 140 follows the rules defined by the selected modules 130a and 130c in creating sort-ready texts 320a (in a sort-ready text meta list 320) from metadata items 300a in a meta list 300 of FIG. 4.

Based on the sort-ready texts 320a created automatically by the sort-ready text creation device 140, the sort execution device 150 sorts the metadata items 300a corresponding to the texts 320a. This creates a sorted meta list 340 made up of a plurality of sorted meta information items (sorted meta information 300b).

The initial information creation device 160 creates information about the initials (initial letters) of metadata items included in the sorted metadata 300b. By adding the initial information thus created, the initial information creation device 160 creates initial information-furnished sorted metadata.

Figure 5:
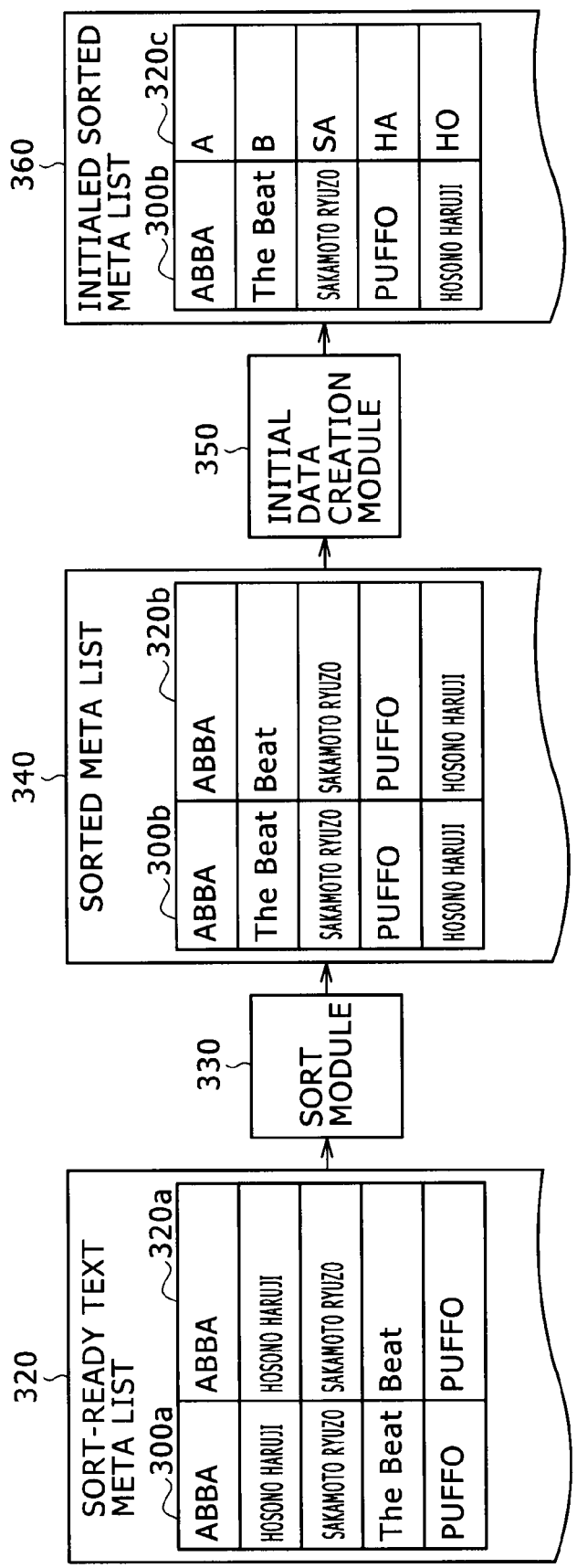
FIG. 5 is a schematic view explanatory of how initial data is created by the first embodiment.

For example, as shown in FIG. 5, the initial information creation device 160 may utilize the initial data creation module 350 to create initial information 320c representing the initials in the meta information 300b included in the sorted meta list 340. By adding the initial information 320c to the sorted metadata 300b, the initial information creation device 160 creates the initial information-furnished sorted meta list 360.

Illustratively, the initial information creation device 160 creates "サ" (sa) from meta information "坂本龍三" (Sakamoto Ryuzo) as initial information. By adding the initial information "サ" thus created to the sorted metadata 300b, the initial information creation device 160 creates the initial information-furnished sorted meta list 360. The initial information may include other initial letters of the information included in the sorted metadata. For example, the initial information from the meta information "坂本龍三" (Sakamoto Ryuzo) may be created as "サガ" (saka) or "サカモ" (sakamo).

The initial information need not necessarily include initials (initial letters). Alternatively, the total number of characters constituting the sorted metadata may be used as initial information. As another alternative, a particular character string included in the sorted metadata may be used as initial information. If the total number of characters making up the sorted metadata is to be used as initial information, then initial information "4" is created from the sorted metadata "坂本太郎" (composed of four kanji characters).

If a particular character string "太郎" (Taro) is to be used as initial information, then the initial information "太郎" is created from sorted metadata items that may include (and may or may not be headed by) the character string "太郎" Illustratively, where song titles include such keywords as "Christmas," "love" and "the sea," any of these words may be adopted as initial information for quick access to a desired song title.

The above-described conditions for creating initial information may be used singly or in a suitable combination to create initial information. For example, if an initial (initial letter), the total number of characters, and a particular character string are used as the conditions for creating initial information, then three initial information items "サ" (sa), "4," and "太郎" (Taro) are created from the sorted metadata "坂本太郎" (Sakamoto Taro).

The information output device 170 causes an external apparatus (e.g., PD such as the portable music player 200) to display the initial information-furnished sorted meta list 360 thus created. Alternatively, the display device 180 may be arranged to display the initial information-furnished sorted meta list 360.

The PC 100 sorts content metadata using the functions of the above-described functional blocks and on the basis of the modules that define the predetermined rules. The sorted metadata is then furnished with initial information.

The PC 100 also includes CPUs, ROMs, RAMs, and interfaces, not shown. The ROMS store programs for carrying out the functions described above. The CPUs execute the programs accommodated in the ROMs, thereby implementing the functions involved.

(Operation of the Information Processing System 10)

How the information processing system 10 works will now be described by referring to the flowchart in FIG. 6. The PC 100 starts its processing in step 600. In step 605, the PC 100 takes in contents as instructed by the user. Typically, the contents may be acquired by ripping CDs or by utilizing the so-called EMD service online.

In step 610, the PC 100 acquires meta information about the contents. Illustratively, the meta information regarding the contents may be read from the contents fetched in step 605, acquired online from the CDDB or the like, or retrieved from the meta information placed beforehand in an onboard car stereo set or like equipment.

In step 615, the PC 100 creates a sort-ready text of the meta information. More specifically, based on the rules of at least one module selected from the plurality of modules held in the storage device 130, the PC 100 automatically creates the sort-ready text corresponding to the meta information acquired in step 610.

In step 620, the PC 100 sorts the meta information based on the automatically created sort-ready text. Sorted meta information is thus created through the sorting of the meta information obtained in step 610.

In step 625, the PC 100 creates initial information made up of initials from the meta information items constituting the meta information that was sorted in step 620. By adding the initial information thus created to the sorted meta information, the PC 100 creates initial information-furnished sorted meta information.

In step 630, the PC 100 transfers the acquired contents and initial information-furnished sorted meta information to the portable music player 200 (PD).

Figure 7:
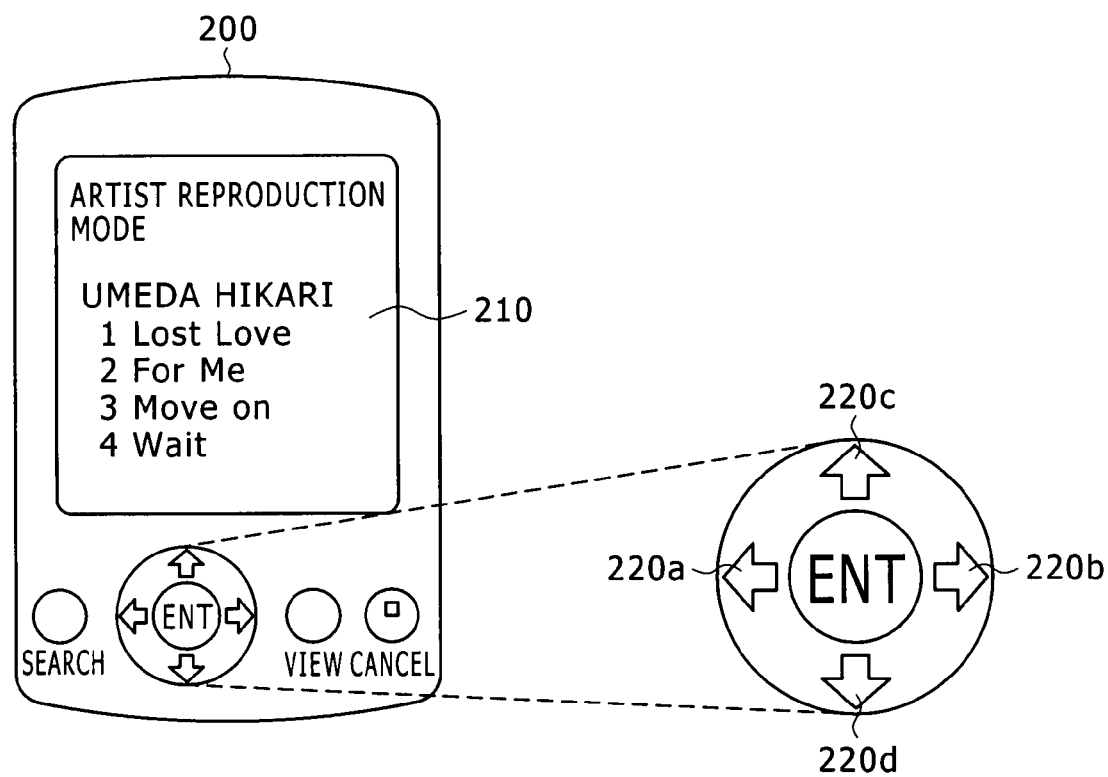
FIG. 7 is a schematic view showing a portable music player.

In response, the portable music player 200 in step 635 displays a list of the transferred contents. More specifically, as shown in FIG. 7, a display section 210 of the player 200 may display an artist name and song titles.

In step 640, the portable music player 200 may change the display of the display section 210 according to the user's key operations (on a left arrow key 220a, a right arrow key 220b, an up arrow key 220c, or a down arrow key 220d).

(Index Jump Search)

Figure 8:
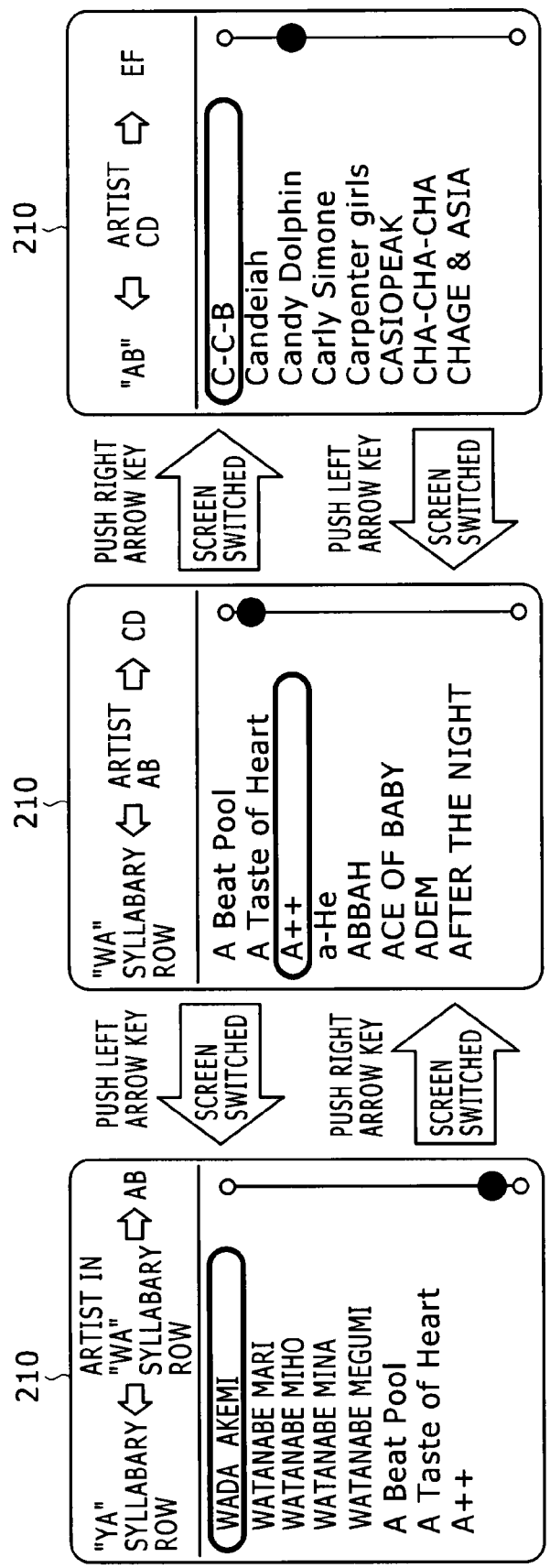
FIG. 8 is a schematic view explanatory of an index jump search made on the portable music player.

Illustratively, the display section 210 at this point may display artist names each with an initial "A" in alphabetical order as shown in the middle of FIG. 8. In such a case, if the user pushes the left arrow key 220a, the display section 210 jumps to a preceding "syllabary row" of artist names and displays the artist names each with an initial "ワ" (wa) in the Japanese alphabetical order.

If the user pushes the right arrow key 220b, the display section 210 jumps from its current display (in the middle of FIG. 8) to the ensuing syllabary row of artist names shown on the right-hand side and displays the artist names with initials "C" and "D" in alphabetical order.

The syllabary row mentioned above refers to any one of those rows of initial characters of meta information which constitute the Japanese syllabary. With meta information typically sorted in the Japanese alphabetical order, there may exist the "ア" (a) syllabary row, "カ" (ka) syllabary row, "サ" (sa) syllabary row, "タ" (ta) syllabary row, "ナ" (na) syllabary row, "ハ" (ha) syllabary row, "マ" (ma) syllabary row, "ヤ" (ya) syllabary row, "ラ" (la) syllabary row, and "ワ" (wa) syllabary row, any one of which may be selected to display the metadata belonging thereto. The preceding row is the row that immediately precedes the syllabary row now displayed on the display section 210, and the ensuing row is the row next to the currently displayed syllabary row on the display section 210. For example, if the artist names belonging to the "タ" (ta) syllabary row are currently displayed on the display section 210, the preceding row is the "サ" (sa) syllabary row and the ensuing row is the "ナ" (na) syllabary row according to the Japanese syllabary.

If meta information is sorted in the English alphabetical order, the information may be grouped (i.e., divided) into units of initials AB, CD, EF, GH, etc. For example, if an artist name with the initial "E" is currently displayed on the display section 210, then the preceding unit is the "CD" unit and the ensuing unit is the "GH" unit. In this respect, where meta information is sorted into syllabary rows in the Japanese alphabetical order as described above, each "row" is a type of unit. The units may be prepared otherwise as long as they are derived from the meta information having been divided appropriately. Illustratively, groups of multiple syllabary rows "アイ" (a, i), "ウエオ" (u, e, o), "カキ" (ka, ki), "クケコ" (ku, ke, ko), etc., may each be considered a unit. Alternatively, groups of three alphabetic characters "ABC," "DEF," etc., representing initials may each be considered an alphabetically divided unit.

It should be noted that the display section 210 is scrolled up when the user pushes the up arrow key 220c and scrolled down when the user pushes the down arrow key 220d.

(Initial Search)

Figure 9:
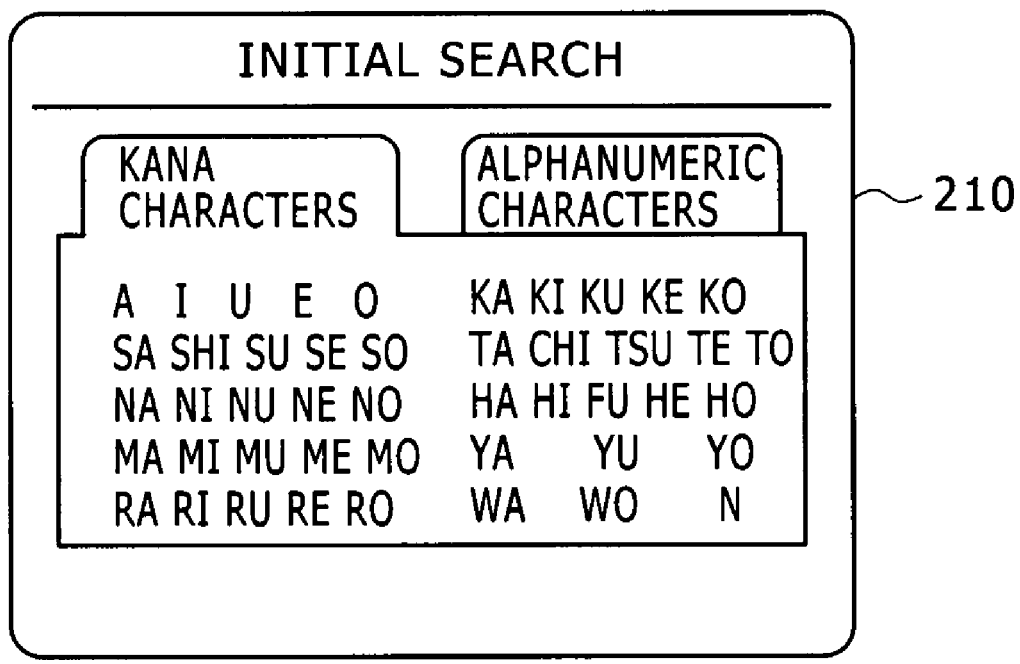
FIG. 9 is a schematic view explanatory of an initial search made on the portable music player.

It is possible to have the display section 210 display initials either in kana characters of the Japanese syllabary or in alphanumeric characters as shown in FIG. 9. When the user designates any one of the displayed initials, artist names each having the designated initial may be displayed. Illustratively, if the user selects the kana character "ウ" (u), then artist names each having the initial "ウ" are displayed in the Japanese alphabetical order.

Figure 6:
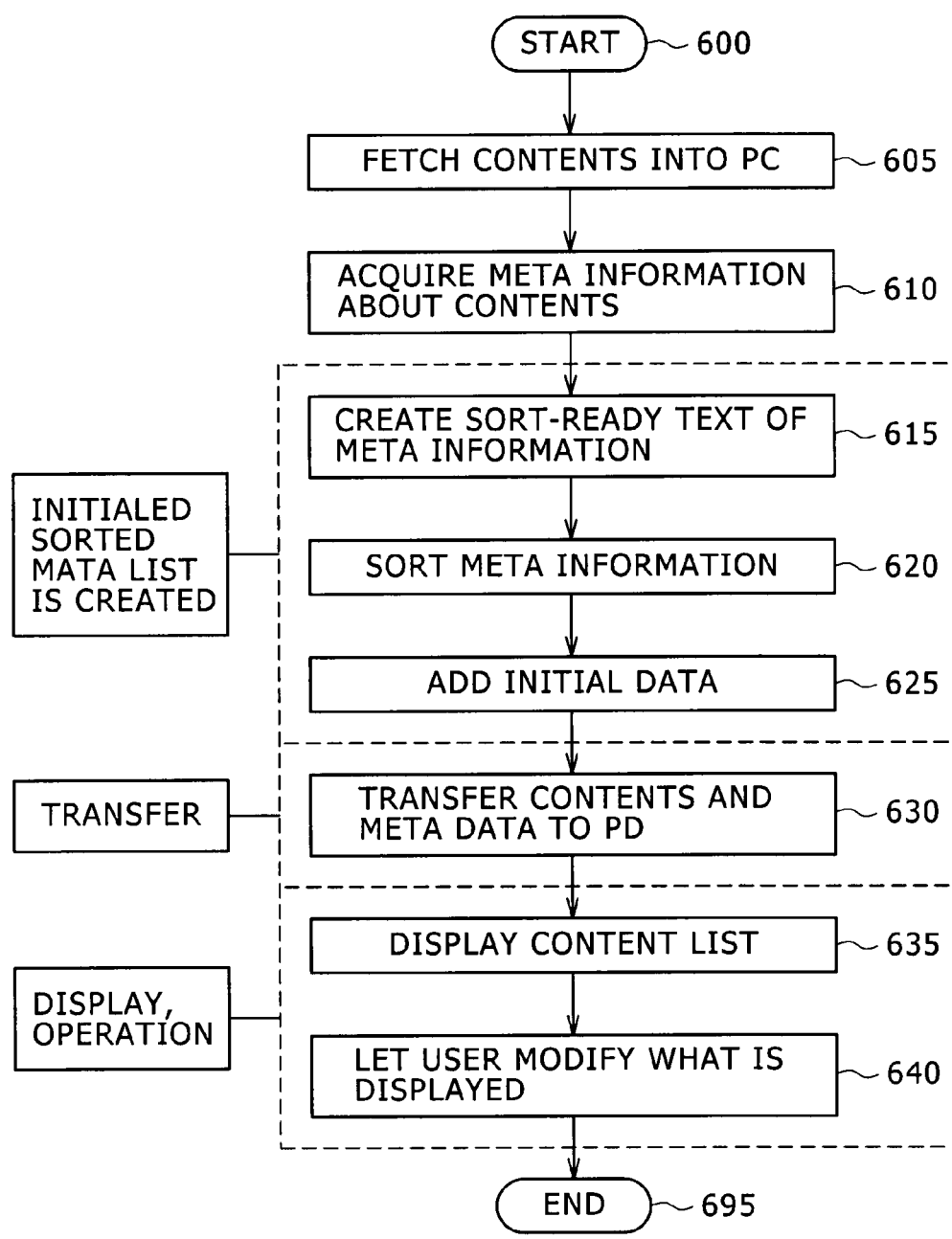
FIG. 6 is a flowchart of steps constituting a routine carried out by the system of the first embodiment.

If such operations by the user are not terminated within a predetermined time period, the processing is terminated in step 695 of FIG. 6 for the moment.

Step 605 is functionally implemented by the communication device 110, step 610 by the information acquisition device 120, step 615 by the sort-ready text creation device 140, step 620 by the sort execution device 150, step 625 by the initial information creation device 160, and step 630 by the information output device 170. Steps 635 and 640 are implemented functionally by the display function of the portable music player 200 (PD) or by the display unit 180 of the PC 100.

According to the first embodiment of the invention, as described above, sort-ready texts are created on the basis of the rules defined by the module or modules selected in accordance with predetermined conditions (see FIG. 4). The metadata of interest is sorted using the sort-ready text thus created, and the resulting sorted metadata is furnished with initial information (see FIG. 5). In this manner, metadata is sorted by use of the readings reflecting the user's preferences and in keeping with predetermined rules.

As opposed to the traditional sorting method whereby metadata is uniformly sorted using metadata as read in the Chinese manner, the inventive method allows the user to have quick access to the desired content by searching through the metadata sorted in a manner preferred by the user and thereby to enjoy the retrieved content in timely fashion.

Second Embodiment

The information processing system 10 practiced as a second embodiment of the invention is functionally different from the first embodiment in that the second embodiment dynamically establishes sort-ready texts and initial information according to user-designated conditions. By contrast, the first embodiment establishes sort-ready texts and initial information statically in keeping with predetermined conditions. The information processing system 10 of the second embodiment will be discussed below with emphasis on the difference from the first embodiment.

On the PC 100 of the second embodiment, the user establishes beforehand the conditions for automatically creating sort-ready texts and the order in which to sort the initials of meta information. In the Japanese language environment, the user may utilize two screens shown in FIG. 10 when making the settings: a sort-ready text automatic creation setting screen for setting the conditions for automatically creating sort-ready texts, and a sort order/initial character setting screen for setting the order in which to sort initials of meta information.
(Dynamic Creation of Sort-Ready Texts According to User Settings)

The user first sets the conditions for automatically creating sort-ready texts. In this example, the user may establish four conditions: "add readings of kanji in hiragana"; "add readings of nicknames in hiragana"; "delete definite articles in English"; and "delete the Japanese prefix "ザ" (za) used as a fake article (skip "za")."

In turn, from the plurality of modules stored in the storage device 130, the sort-ready text creation device 140 selects at least one module corresponding to the conditions designated by the user (user settings). FIG. 11 is a schematic view depicting how a sort-ready text is dynamically created according to the user settings. As shown in the sort-ready text creation module of FIG. 11, the sort-ready text creation device 140 selects the definite article skip module 130a according to the user-designated condition "delete definite articles in English." The sort-ready text creation device 140 then selects the Japanese "za" skip module 130b in accordance with the user-designated condition "delete the Japanese prefix "ザ" (za) (skip "za")." Given the user-designated condition "add readings of kanji in hiragana," the sort-ready text creation device 140 selects the reverse conversion module 130c. The sort-ready text creation device 140 further selects the nickname conversion module 130e in keeping with the user-designated condition "add readings of nicknames in hiragana."

In creating sort-ready texts, the sort-ready text creation device 140 uses the rules of the selected modules in descending order of the module priorities stored in the storage device 130. For example, if the nickname conversion module 130e is higher in priority than the reverse conversion module 130c as they are held in the storage device 130 and if a metadata item "砂原良一" (Sunahara Yoshiichi) is selected from the meta list 300, then the sort-ready text creation device 140 creates not the hiragana reading "すなはらよしいち" according to the rules of the reverse conversion table 130c but the nickname "まりん" (Marin) as per the rules of the nickname conversion module 130e as a sort-ready text. Sort-ready texts 320a are thus created in a prioritized manner as shown in the sort-ready text meta list 320, out of the metadata items 300a in the meta list 300.

In the above example, the English reading conversion module 130d is not selected. As a result, the metadata item "PUFFO" is not converted to hiragana; the original notation "PUFFO" is left unchanged and used as a sort-ready text 320a.

How the user sets the order in which to sort the initials of meta information will now be described by returning to the setting screen in Japanese shown in FIG. 10. The screen for use by the user is a sort-use initial character setting screen for establishing the order in which to sort the initial characters of meta information. In this example, the initials of meta information are sorted in the English alphabetical order, in ascending/descending order of numbers, in the Japanese alphabetical order (starting from the "あ" (a) syllabary row and ending with the character "ん" (n)), and otherwise, in that order, for people who prefer Western music. For those who prefer Japanese music, the initials of meta information are sorted in the Japanese alphabetical order (starting from the "あ" (a) syllabary row followed by the "か" (ka) row, "さ" (sa) row, etc.), in ascending/descending order of numbers, in the English alphabetical order, and otherwise, in that order.

In this example, the user selects the settings for people who prefer Western music. In turn, as shown in FIG. 11, the sort execution device 150 sorts the sort-ready text meta list 320 in accordance with the rules of the sort module 330 for the user who prefers Western music (i.e., the rules specify that data items be sorted in the English alphabetical order, in ascending/descending order of numbers, in the Japanese alphabetical order (starting from the "あ" (a) syllabary row and ending with the character "ん" (n)), and otherwise, in that order). This creates a sorted meta list 340 (sorted metadata items). The sorted meta list 340 contains meta information items 300b starting with alphabetical characters "PUFFO" followed by other items in the Japanese alphabetical order.

FIG. 12 shows typical sort order settings that may be established depending on the language environment of the user. As indicated, for the Japanese language (in Japanese language mode), the character types that can be set for sort order are the numbers and symbols, alphabetic characters, Japanese characters (with readings in kana characters), and others. For the Korean language (in Korean language mode), the character types that can be set for sort order are the Hangul and Chinese characters (with readings in phonetic alphabet), numbers and symbols, alphabetic characters, and others. For the Chinese language (in Chinese language mode), the character types that can be set for sort order are the numbers and symbols, alphabetic characters, simplified and traditional Chinese characters (with readings in phonetic alphabet), and others. For the English, French, German, Italian and Spanish languages (in English language mode), the character types that can be set for sort order are the numbers and symbols, alphabetic characters, and others. For the Russian language (in Russian language mode), the character types that can be set for sort order are the numbers and symbols, alphabetic characters, Cyrillic characters, and others.

The user may dynamically establish the order in which to sort target data upon initialization or at a given point in time in accordance with the sort rules described above. The default settings determined automatically according to the user's language environment may be further modified by the user as needed.

Figure 13:
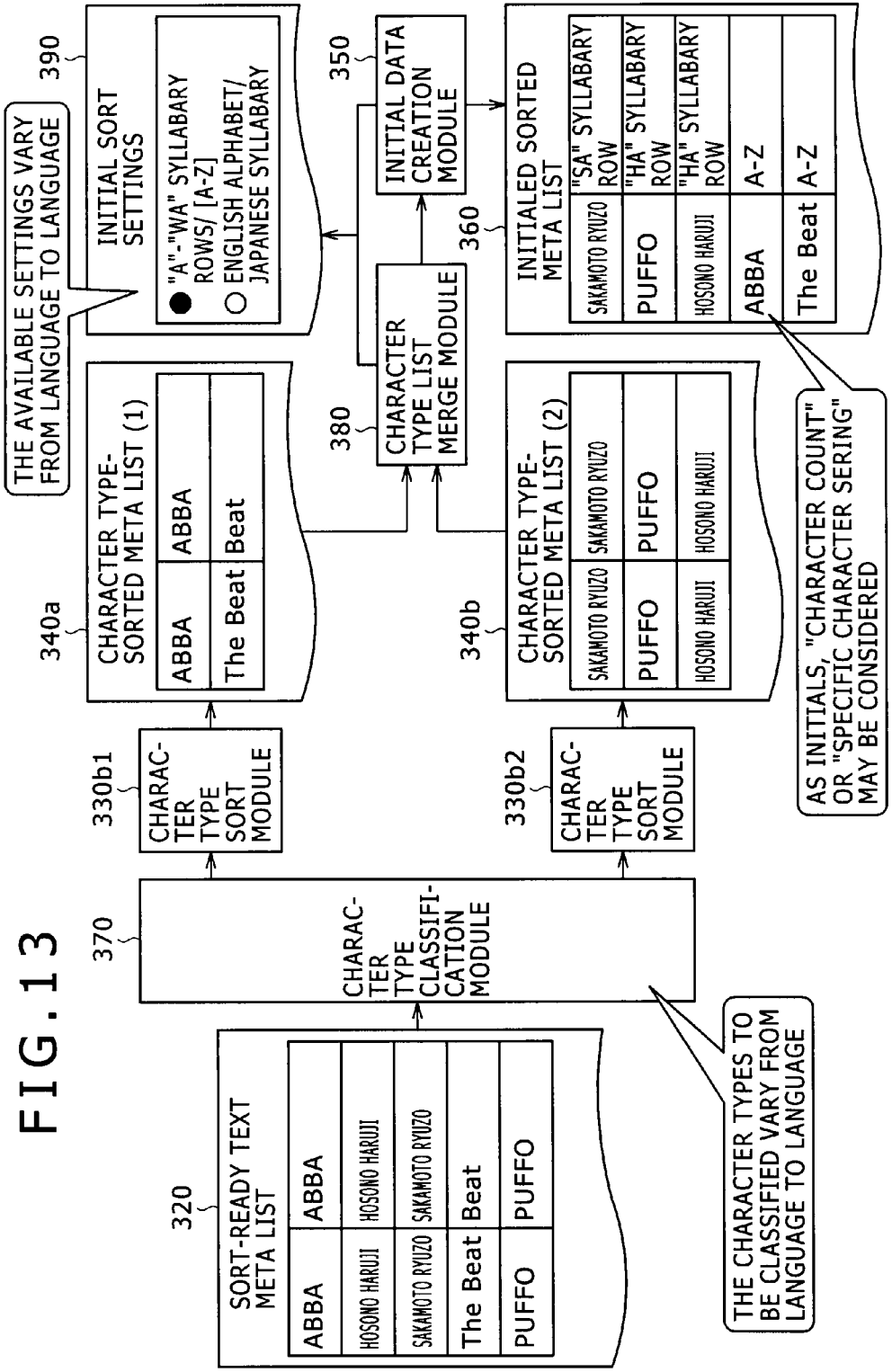
FIG. 13 is a schematic view explanatory of how initials are dynamically established by the second embodiment according to user settings.

There may be two or more character types used in meta information, as shown in FIG. 13 (Japanese and English are used in this example; the character types vary depending on the user's language environment). In such a case, the sort execution device 150 classifies the meta information by character type using a character type classification module 370 and sorts the classified meta information using character type sort modules 330$b$1 and 330$b$2, thereby creating character type-sorted meta information 340$a$ and 340$b$. The sort execution device 150 then merges the two groups of character type-sorted meta information 340$a$ and 340$b$.

(Dynamic Setting of Initials According to User Settings)

What follows is a description of how to set typical ways in which to sort dynamically initials of different character types. As shown in FIG. 14, the basic sort rules that can be set vary depending on the language environment (i.e., character type) in effect. For example, if the character type is alphabetical characters, the user can establish as the basic sort rules "alphabetical order" and "from uppercase to lowercase letters," in that order, for the initials in alphabetic characters starting with "A" and ending with "Z."

If the character types are numbers and symbols, the user can establish as the basic sort rules "numbers in order of character codes" and "symbols in order of character codes," in that order, for such initials as "5" and "#."

If the character type is the Hangul, then the user can establish as the basic sort rule "lexical order (in order of character codes)" for the initials in Hangul consonants and Chinese characters.

If the character type is Japanese, the user can establish as the basic sort rules "in Japanese alphabetical order," "from hiragana to katakana," "from normal pronunciations to nasal 'N's' to voiced consonants to plosives," and "in order of character codes," in that order, for the initials in Japanese characters.

If the character types are alphabetic characters as well as simplified and traditional Chinese characters (read in pinyin), then the user can establish as the basic sort rules, "from 'A' in English, 'A' in Chinese; to 'B' in English, 'B' in Chinese; ..., to 'Z' in English, 'Z' in Chinese," "the same rules as those for alphabetic characters," and "in order of character codes," in that order, for the initials in alphabetic characters as well as in simplified and traditional Chinese characters.

If the character type is Cyrillic characters, the user can establish as the basic sort rules "in Cyrillic alphabetical order," "from uppercase to lowercase characters," and "in order of character codes," in that order, for the initials in Cyrillic alphabetical characters.

For other character types, the user may establish "character code order" as the basic sort rule for the initials in such characters.

Initial sort settings 390 shown in FIG. 13 are thus established dynamically based on the basic sort rules above and in keeping with the user's language environment. Given the dynamically established initial sort settings, the sort execution device 150 rearranges the merged sorted meta information into sorted meta information.

The initial information creation device 160 then creates initial information from the meta information items included in the sorted meta information through the use of the initial data creation module 350. By adding the created initial information to the sorted metadata, the initial information creation device 160 creates an initial information-furnished sorted meta list 360.

Illustratively, the initial sort settings 370 in FIG. 13 are made by the user to establish the sort order rules of "from 'あ' (a) syllabary row to 'わ' (wa) syllabary row" and "from 'A' to 'Z'." In keeping with the user-established rules, the initial information creation device 160 sorts the merged sorted metadata first in the Japanese alphabetical order and then in the English alphabetical order, thereby creating initial information-furnished sorted metadata 360.

(Operation of the Information Processing System 10)

How the information processing system 10 of the second embodiment works will now be described. The workings of the second embodiment are basically the same as those of the first embodiment shown in the flowchart of FIG. 6. The difference from the first embodiment is that an initialed sorted meta list is dynamically created in steps 615 through 625 constituting the process for creating an initialed sorted meta list according to the user settings. Steps 615 through 625 of FIG. 6 are thus replaced by the steps shown in FIG. 15 for the second embodiment. How the second embodiment works with these steps is described below in detail.

Figure 15:
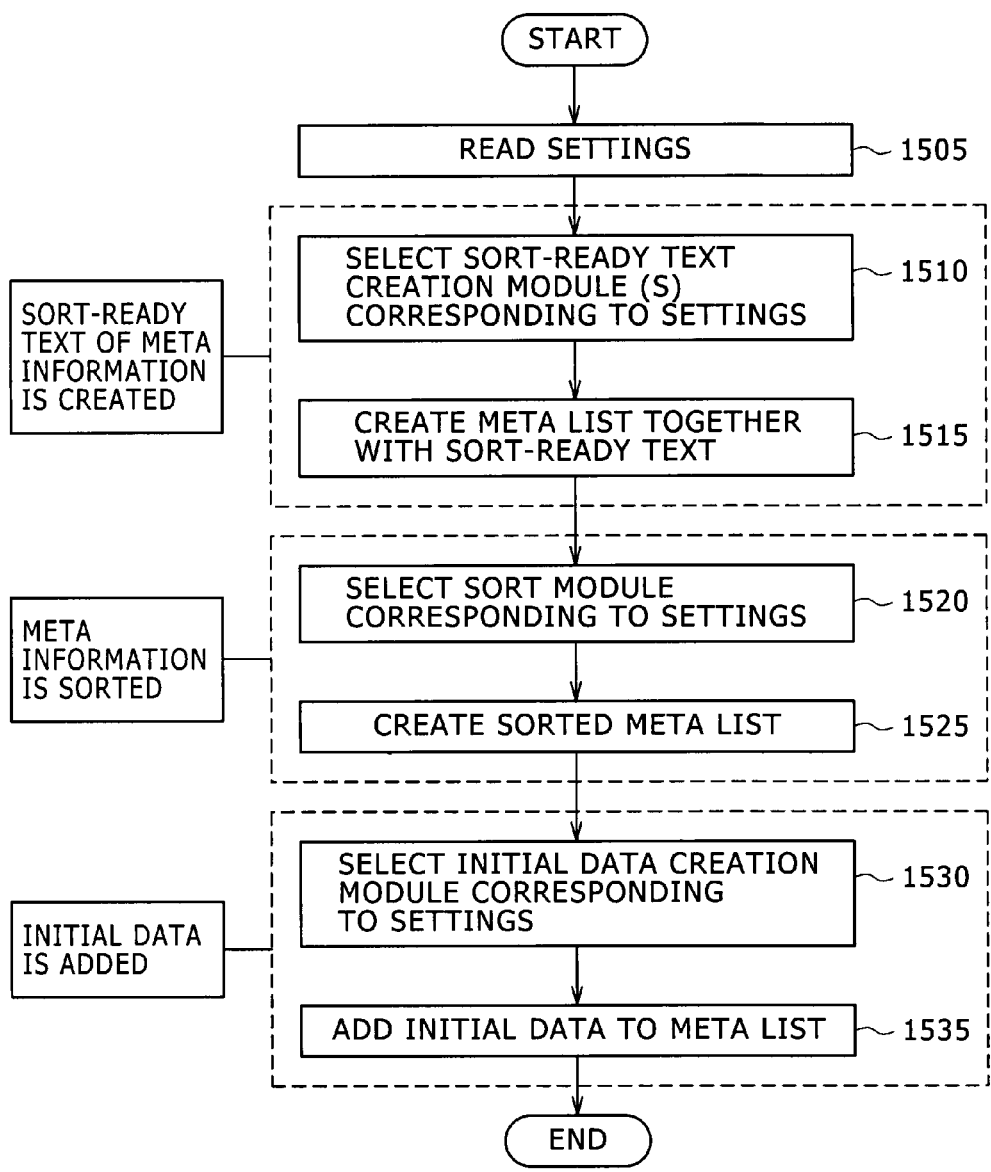
FIG. 15 is a flowchart of steps constituting an initialed sorted metadata creation routine carried out by the system of the second embodiment.

After carrying out steps 600 through 610 in FIG. 6, the PC 100 reaches step 1505 in FIG. 15 and reads the user settings. In step 1510, the PC 100 selects at least one sort-ready text creation module according to the user settings from the plurality of modules stored in the storage device 130. In step 1515, the PC 100 creates a sort-ready text (sort-ready text-furnished meta list) based on the rules defined by the selected sort-ready text creation module or modules.

In step 1520, the PC 100 selects the sort module corresponding to the user settings. In step 1525, the PC 100 creates a sorted meta list by sorting the sort-ready text-furnished meta list using the selected sort module.

In step 1530, the PC 100 selects the initial data creation module corresponding to the user settings. In step 1535, the PC 100 creates initial information based on the selected initial data creation module, and creates an initial information-furnished sorted meta list by adding the created initial information to the sorted meta information. Thereafter, the PC 100 carries out steps 630 through 640 in FIG. 6 to get the portable music player 200 to display the content list.

Steps 1510 and 1515 are implemented functionally by the sort-ready text creation device 140, steps 1520 and 1525 by the sort execution device 150, and steps 1530 and 1535 by the initial information creation device 160.

According to the second embodiment of the invention described above, the user dynamically establishes the sort-ready text creation module and the initial sort rules in keeping with the user's preferences and depending on the language environment adopted by the user. This allows meta information to be sorted as per the user preferences and in accordance with the readings in the user's language. As a result, the user can have quick access to the desired content using the metadata that has been sorted in a manner better reflecting the user's liking.

Recently, content reproducing apparatuses such as the portable device (PD) have been equipped with storage facilities capable of accommodating huge quantities of contents. This has required the user to spend ever-increasing amounts of time and effort when searching for and retrieving the desired content from the enormous quantities of stored contents. The information processing system 10 of the second embodiment frees the user from such tiresome, time-consuming chores and allows the user to access and enjoy the preferred content in rapid and timely fashion.

In the foregoing description, the user was shown utilizing the user setting screen of the Japanese language version in FIG. 10 when establishing beforehand the conditions for automatically creating sort-ready texts and the order in which to sort the initial characters of contents. If the user employs any other language, the user can make the settings on a setting screen corresponding to the language being used.

For example, if the user employs Chinese, the user can make the settings on the user setting screen of the Chinese language shown in FIG. 16. On this screen, the user sets the condition "add readings in pinyin" for automatically creating sort-ready texts. Given the user settings, the sort-ready text creation device 140 selects the reverse conversion module 130c from the plurality of modules stored in the storage device 130 and uses the rules defined by the selected module 130c to create automatically a sort-ready text with readings in pinyin.

The user then sets the order in which to sort the initials of meta information on a screen such as one shown in the lower part of FIG. 16. If the user selects "Mixed sort" on the screen, then the meta information is rearranged in such a manner that its initial characters may be sorted in the English alphabetical order (ABC . . . ; including readings in pinyin), in ascending/descending order of numbers, and otherwise, in that order. If the user selects "Independent sort" on the screen, then the meta information is rearranged so that its initials may be sorted in the English alphabetical order, in order of simplified Chinese characters read in pinyin, in order of traditional Chinese characters read in pinyin, and otherwise, in that order.

In this example, the user is assumed to select "Independent sort." This causes the sort execution device 150 to create a sorted meta list 340 (sorted metadata) by sorting the sort-ready text meta list 320 based on the rules of the sort module 330 (i.e., in the English alphabetical order, in ascending/descending order of numbers, and otherwise). It should be noted that traditional Chinese characters are used primarily in Taiwan and Hong-Kong while simplified Chinese characters are employed in all other areas under Chinese jurisdiction.

The user settings explained above may be dynamically established by the user upon initialization or at a given point in time. The default settings determined automatically in accordance with the user's language environment may be modified by the user as needed.

As described, the information processing system 10 of the second embodiment can sort meta information in keeping with the user's language and preferences.

(Variation of Index Jump Search)

In addition to the method of index jump search shown in FIG. 8, index jump search may be carried out by a modified method illustrated in FIG. 17. This method causes the display section 210 to display artist names in the Japanese (or English) alphabetical order along with a syllabary row (unit) indication on the right. The display allows the user to select both the artist name and the syllabary row. Described blow in reference to the screens of FIG. 17 and the flowchart of FIG. 18 is how index jump search is carried out by this alternative method.

If the display section 210 gives the display shown in the top left part of FIG. 17, the user selects a desired artist name in step 1800 of FIG. 18. If in step 1805 the user is found to have pushed the up arrow key 220c or down arrow key 220d, then the portable music player 200 goes to step 1810. In step 1810, the portable music player 200 selects the artist name immediately preceding or following the currently selected artist name and returns to step 1805. With the display section 210 showing the top-left display in FIG. 17, it might happen that the right arrow key 220b is pushed in step 1805 of FIG. 18. In that case, the portable music player 200 goes to step 1815 and selects the syllabary row ("カ" (ka) syllabary row in the example of FIG. 17) which contains the initial character of the currently selected artist name. This causes the display section 210 to give the display in the top right part of FIG. 17. With the display section 210 still showing the top-left display in FIG. 17, the left arrow key 220a may be pushed in step 1805 of FIG. 18. If that happens, the portable music player 200 goes to step 1820 and terminates the index jump search.

In step 1825 following step 1815, the up arrow key 220c or down arrow key 220d may be pushed. In this case, the portable music player 200 goes to step 1830, selects the syllabary row immediately preceding or following the currently selected row, and returns to step 1825. Illustratively, with the display section 210 showing the top-right screen in FIG. 17, pushing the down arrow key 220d causes the display section 210 to give the screen shown in the bottom right part of FIG. 17. With the display screen 210 showing the bottom-right screen in FIG. 17, the ENT (enter) key or the left arrow key 220a may be found in step 1825. If that happens, the portable music player 200 goes to step 1835, selects the first artist name in the currently selected syllabary row, and returns to step 1805. This brings the display section 210 to the screen shown in the bottom left part of FIG. 17. With the display section 210 showing the bottom-right screen in FIG. 17, pushing the right arrow key 220b in step 1825 causes the portable music player 200 to reach step 1840 and terminate the index jump search.

Illustratively, if the user pushes the down arrow key 220d with the display section 210 showing the top-right screen in FIG. 17, then the "サ" (sa) syllabary row immediately following the currently selected "カ" (ka) syllabary row is selected as shown in the bottom-right screen. If at this point the user pushes the left arrow key 220a, the first artist name in the selected "サ" (sa) syllabary row is selected as shown in the bottom-left screen of FIG. 17 on the display section 210.

As described above, the right arrow key 220b is used to select a syllabary row displayed on the right-hand side of the display screen. If syllabary rows are arranged to be displayed on the left-hand side of the screen, then the left arrow key 220a is used to select the desired syllabary row.

With the above embodiments, the workings of the component parts and devices, interrelated as described, may be construed as series of steps or processes. Such steps or processes executable in interrelated fashion may be considered to make up a method practiced as another embodiment of the present invention.

The workings of the component parts and devices forming the above-described embodiments may be replaced by steps and processes constituting a program practiced as another embodiment of the present invention. Such a program may be stored on a computer-readable recording medium which may be considered yet another embodiment of the present invention.

It is to be understood that while the invention has been described in conjunction with specific embodiments with reference to the accompanying drawings, the invention is not limited to these. It is evident that many alternatives, modifications and variations will become apparent to those skilled in the art in light of the foregoing description. Accordingly, it is intended that the present invention embrace all such alternatives, modifications and variations as fall within the spirit and scope of the appended claims.

For example, the CDDB server 400 need not store contents (e.g., songs) themselves; the server may hold only meta information about the contents of interest. In this case, the information processing apparatus (PC 100) acquires only meta information from the CDDB server 400 and, based on the acquired meta information, creates sort-ready texts as well as sorted meta information supplemented with initial information. Thereafter, the portable music player 200 may display the initial information-furnished sorted meta information on its screen. The user may select desired contents from the displayed information, and the selected contents may be acquired illustratively from CDs.

In this manner, the user can choose contents such as yet-to-be-heard songs from lists of meta information. Because there is no need to bring whole contents together with meta information into the information processing apparatus (PC 100) from the start, the processing load on the information processing apparatus is alleviated. Furthermore, utilization of the storage area in the information processing apparatus (PC 100) is reduced appreciably.

The information processing apparatus (PC 100) may be of any type as long as it can execute the above-described operations on meta information. For example, the information processing apparatus may be a stereo set with a built-in hard disk, a DVD/HD recorder-player, a home storage server, a car navigation system, a game console, or other suitable device.

The portable device (PD) is not limited to the portable music player 200 if it can display and reproduce such contents as images and texts. Illustratively, the portable device may be a mobile phone, a PDA (personal digital assistant), a portable game machine, a digital camera, a digital video camera, a head-mount display, or other suitable device.

The embodiments above of the present invention were discussed primarily in connection with artist names arranged in the Japanese or English alphabetical order. Alternatively, song titles and album titles, among others, arranged in the Japanese or English alphabetical order may be addressed by embodiments of the invention.

The information processing system embodying the present invention is not restricted in usage to the languages mentioned in the foregoing description. Alternatively, the inventive system may be applied to all languages on earth, including Portuguese, Arabic, Indonesian, That, Turkish, Vietnamese, Tagalog, Finnish, Swedish, Farsi, and Rumanian.

As described above in detail, the present invention provides an information processing apparatus, an information processing method, and an information processing program for sorting meta information according to the user's language and preferences.

INDUSTRIAL APPLICABILITY

The present invention can be applied to an information processing apparatus for sorting meta information in accordance with the user's language and preferences, as well as to an information processing system that utilizes such an apparatus.

The invention claimed is:

1. An information processing apparatus comprising:
    an information acquisition device configured to acquire a plurality of meta information items;
    a storage apparatus that stores a plurality of modules each having rules defined for creating a sort-ready text according to readings representative of how the corresponding acquired meta information item is read;
    a sort-ready text creation device configured to create automatically the sort-ready text for each of the meta information items acquired by use of at least one of the stored modules which includes rules applicable to predetermined conditions; and
    a sort execution device configured to sort each of said meta information items corresponding to each of said sort-ready texts based on the sort-ready text which has been created automatically for each of said meta information items, thereby automatically creating sorted meta information made up of a plurality of sorted meta information items;
    wherein, if each of the acquired meta information items is made up of at least two character types, then said sort execution device classifies the meta information items by each of said character types and sorts each of the classified meta information items based on the sort-ready text associated with the classified meta information item in question, thereby creating sorted meta information for each of said character types.

2. The information processing apparatus according to claim 1, further comprising
    an initial information creation device configured to create initial information from each of said meta information items included in said sorted meta information based on said predetermined conditions, before adding the created initial information to each of said meta information items included in said sorted meta information, thereby creating automatically said sorted meta information furnished with said initial information.

3. The information processing apparatus according to claim 2, wherein, based on the condition of creating initial information beginning with a first character of given information, said initial information creation device creates said initial information beginning with a first character of each of said meta information items included in said sorted meta information.

4. The information processing apparatus according to claim 2, wherein, based on the condition of creating initial information from a specific character string included in given information, said initial information creation device creates said initial information from said specific character string of each of said meta information items included in said sorted meta information.

5. The information processing apparatus according to claim 1, wherein said sort-ready text creation device selects at least one of said plurality of modules for sorting each of said meta information items in accordance with at least either conditions established by a user or a language used by said user, and automatically creates said sort-ready text based on the rules defined by the selected module or modules.

6. The information processing apparatus according to claim 1, wherein:
    said storage device stores priorities of said rules defined by each of said stored modules, said priorities being in effect when said rules are applied; and
    said sort-ready text creation device adopts said rules successively beginning with the rule of the highest priority down to that of the lowest priority as defined by the selected module or modules, as the rules for creating said sort-ready text.

7. The information processing apparatus according to claim 1, wherein said initial information creation device merges the meta information items sorted by each of said character types and adds said initial information to each of said meta information items included in the merged sorted meta information, thereby creating the sorted meta information furnished with said initial information.

8. The information processing apparatus according to claim 2, further comprising
a display device configured to display said sorted meta information furnished with said initial information created automatically.

9. The information processing apparatus according to claim 2, further comprising
an information output device configured to cause an external apparatus to display said sorted meta information furnished with said initial information created automatically.

10. The information processing apparatus according to claim 8, wherein said display device displays the meta information having the initial designated by a user, through the use of said initial information included in said sorted meta information furnished with said initial information.

11. The information processing apparatus according to claim 9, wherein said information output device causes said external device to display the meta information having the initial designated by a user, through the use of said initial information included in said sorted meta information furnished with said initial information.

12. The information processing apparatus according to claim 10, wherein,
if each of the acquired meta information items is in Japanese, then said sort-ready text creation device automatically creates a sort-ready text in kana characters for each of said meta information items through the use of a kanji-to-kana conversion module selected from among said plurality of modules;
said sort execution device sorts each of said meta information items in the Japanese alphabetical order through the use of the automatically created sort-ready text in kana characters;
said initial information creation device adds said initial information to each of said meta information items sorted in the Japanese alphabetical order; and,
based on said initial information, said display device displays consecutively said meta information items in the Japanese alphabetical order starting from the meta information having the initial designated by said user.

13. The information processing apparatus according to claim 10, wherein,
if each of the acquired meta information items is in Japanese, then said sort-ready text creation device automatically creates a sort-ready text in kana characters for each of said meta information items through the use of a kanji-to-kana conversion module from among said plurality of modules;
said sort execution device sorts each of said meta information items in the Japanese alphabetical order through the use of the automatically created sort-ready text in kana characters;
said initial information creation device adds said initial information to each of said meta information items sorted in the Japanese alphabetical order; and,
based on said initial information, said display device displays consecutively said meta information items in the Japanese alphabetical order starting from the meta information included in a Japanese syllabary row designated by said user.

14. The information processing apparatus according to claim 12, wherein said display device displays kana characters in the Japanese alphabetical order, prompts said user to designate one of the displayed kana characters and, based on said initial information, displays consecutively said meta information items in the Japanese alphabetical order starting from the meta information having the designated initial.

15. The information processing apparatus according to claim 8, wherein said display device displays consecutively said meta information items starting from the meta information included in one of two syllabary rows, one immediately preceding and the other immediately following the syllabary row including the meta information being displayed, in response to an operation by a user and based on said initial information.

16. The information processing apparatus according to claim 1, wherein said plurality of modules are among an English definite article skip module, a Japanese "za" skip module, a reverse conversion module, an English reading conversion module, a nickname conversion module, a symbol reading conversion module, a difficult-to-read name conversion module, a number reading conversion module, and a first name/surname inversion module.

17. The information processing apparatus according to claim 8, wherein said information processing apparatus is an apparatus capable of reproducing contents indicated by the meta information being displayed.

18. An information processing method comprising;
acquiring a plurality of meta information items;
storing into a storage apparatus a plurality of modules each having rules defined for creating a sort-ready text according to readings representative of how the corresponding acquired meta information item is read;
creating automatically the sort-ready text for each of the meta information items acquired by use of at least one of the stored modules which includes rules applicable to predetermined conditions;
sorting each of said meta information items based on the sort-ready text which has been created automatically for each of said meta information items, thereby automatically creating sorted meta information made up of a plurality of sorted meta information items; and
creating initial information from each of said meta information items included in said sorted meta information based on said predetermined conditions, and adding the created initial information to each of said meta information items included in said sorted meta information, thereby creating automatically said sorted meta information furnished with said initial information;
wherein, if each of the acquired meta information items is made up of at least two character types, then said sort execution device classifies the meta information items by each of said character types and sorts each of the classified meta information items based on the sort-ready text associated with the classified meta information item in question, thereby creating sorted meta information for each of said character types.

19. A non-transitory computer readable storage medium including computer executable instructions which when executed by a computer cause a computer to carry out a procedure comprising:
acquiring a plurality of meta information items;
storing into a storage apparatus a plurality of modules each having rules defined for creating a sort-ready text according to readings representative of how the corresponding acquired meta information item is read;
creating automatically the sort-ready text for each of the meta information items acquired by use of at least one of the stored modules which includes rules applicable to predetermined conditions;

sorting each of said meta information items corresponding to each of said sort-ready texts based on the sort-ready text which has been created automatically for each of said meta information items, thereby automatically creating sorted meta information made up of a plurality of sorted meta information items; and creating initial information from each of said meta information items included in said sorted meta information based on said predetermined conditions, before adding the created initial information to each of said meta information items included in said sorted meta information, thereby creating automatically said sorted meta information furnished with said initial information;

wherein, if each of the acquired meta information items is made up of at least two character types, then said sort execution device classifies the meta information items by each of said character types and sorts each of the classified meta information items based on the sort-ready text associated with the classified meta information item in question, thereby creating sorted meta information for each of said character types.

* * * * *